United States Patent
Sano et al.

(10) Patent No.: US 10,291,115 B2
(45) Date of Patent: May 14, 2019

(54) POWER FACTOR CORRECTING DEVICE, BIDIRECTIONAL AC/DC CONVERSION APPARATUS AND COMPUTER PROGRAM

(71) Applicant: Sumitomo Electric Industries, Ltd., Osaka-shi (JP)

(72) Inventors: Takaaki Sano, Osaka (JP); Takeshi Ariyoshi, Osaka (JP); Keiji Tashiro, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/763,679

(22) PCT Filed: Nov. 4, 2016

(86) PCT No.: PCT/JP2016/082724
§ 371 (c)(1),
(2) Date: Mar. 27, 2018

(87) PCT Pub. No.: WO2017/078115
PCT Pub. Date: May 11, 2017

(65) Prior Publication Data
US 2018/0278149 A1 Sep. 27, 2018

(30) Foreign Application Priority Data
Nov. 6, 2015 (JP) ................................. 2015-218457

(51) Int. Cl.
*H02M 3/335* (2006.01)
*H02M 1/42* (2007.01)
(Continued)

(52) U.S. Cl.
CPC ....... *H02M 1/4208* (2013.01); *H02M 1/4225* (2013.01); *H02M 3/33584* (2013.01);
(Continued)

(58) Field of Classification Search
CPC ............ H02M 5/40; H02M 5/42; H02M 5/44; H02M 5/443; H02M 5/45; H02M 5/4505;
(Continued)

(56) References Cited

U.S. PATENT DOCUMENTS

2001/0048604 A1* 12/2001 Oka ........................ H02M 1/12
363/44
2011/0194318 A1* 8/2011 Kono ................ H02M 7/53875
363/37
(Continued)

FOREIGN PATENT DOCUMENTS

JP     H10-323050 A    12/1998
JP     H11-299244 A    10/1999
(Continued)

*Primary Examiner* — Bryan R Perez
(74) *Attorney, Agent, or Firm* — Baker Botts L.L.P.; Michael A. Sartori

(57) ABSTRACT

A power factor correcting device that controls switching of a converter that converts AC voltage inputted via a circuit with a capacitor through which reactive current flows into DC voltage calculates the magnitude of the reactive current based on the magnitude of the AC voltage inputted to the converter and the capacitance of the capacitor and corrects a power factor including the circuit, calculates a target value for a phase delay of the AC current with respect to the AC voltage based on the calculated magnitude and the magnitude of the AC current inputted to the converter or the magnitude of the DC power outputted from the converter, and calculates an operation amount for delaying the phase of the switching based on the calculated target value.

20 Claims, 12 Drawing Sheets

(51) Int. Cl.
*H02M 7/797* (2006.01)
*H02M 7/219* (2006.01)
*H02M 1/44* (2007.01)
*H02M 1/00* (2006.01)

(52) U.S. Cl.
CPC .......... *H02M 7/219* (2013.01); *H02M 7/797* (2013.01); *H02M 1/44* (2013.01); *H02M 2001/007* (2013.01); *Y02B 70/126* (2013.01)

(58) Field of Classification Search
CPC ...... H02M 5/451; H02M 5/452; H02M 5/458; H02M 5/4585; H02M 2001/007; H02M 3/33584; H02M 1/4208; H02M 1/4225; H02M 7/797; H02M 7/219; Y02B 70/126
See application file for complete search history.

(56) References Cited

U.S. PATENT DOCUMENTS

2013/0088010 A1\* 4/2013 Ahnert .................. F03D 7/0224
290/44
2016/0336874 A1\* 11/2016 Kikuchi ................ H02M 7/483

FOREIGN PATENT DOCUMENTS

| JP | 2013-247817 A | 12/2013 |
| JP | 2015-527044 A | 9/2015 |
| WO | 2014/031653 A1 | 2/2014 |

\* cited by examiner

US 10,291,115 B2

POWER FACTOR CORRECTING DEVICE, BIDIRECTIONAL AC/DC CONVERSION APPARATUS AND COMPUTER PROGRAM

CROSS-REFERENCE TO RELATED APPLICATIONS

The present application is the national phase under 35 U.S.C. § 371 of PCT International Application No. PCT/JP2016/082724 which has an International filing date of Nov. 4, 2016 and designated the United States of America

FIELD

The present invention relates to a power factor correcting device, a bidirectional AC/DC conversion apparatus and a computer program.

The present application claims the benefit of Japanese Patent Application No. 2015-218457 filed in Nov. 6, 2015, the entire contents of which are herein incorporated by reference.

BACKGROUND

A motorized vehicle such as a plug-in hybrid electric vehicle (PHEV) and an electric vehicle (EV) that is mounted with an AC/DC converter for converting AC (alternative current) voltage supplied from a commercial power source for home use into DC (direct current) voltage and charges its battery with the converted DC voltage converted by the AC/DC converter has been in widespread use.

In recent years, expectations run high that a battery for a motorized vehicle such as a plug-in hybrid electric vehicle and an electric vehicle is utilized for disaster or emergency power supply. In order to utilize the battery as an emergency power supply, bidirectional conversions from AC voltage to DC voltage and from DC voltage to AC voltage are required.

Japanese Patent Application Publication Laid-Open No. 2013-247817 discloses a charger control system (corresponding to a bidirectional AC/DC conversion apparatus) that performs bidirectional conversions between AC voltage from an AC power source and DC voltage from a battery. The charger control system includes a power factor correction (hereinafter referred to as PFC) circuit having a power factor correcting function upon charging and discharging of a battery and an isolated bidirectional DC/DC converter that is cascade-connected to the PFC circuit.

The DC/DC converter includes two full bridge circuits provided on the primary and the secondary sides of a transformer, each of which functions as a DC/AC inverter and a rectifier circuit. More specifically, upon charging of the battery, the full bridge circuit on the PFC circuit side and the full bridge circuit on the battery side respectively function as a DC/AC inverter and a rectifier circuit while upon discharging of the battery, the full bridge circuit on the battery side and the full bridge circuit on the PFC circuit side respectively function as a DC/AC inverter and a rectifier circuit.

In a conversion apparatus similar to that disclosed in Japanese Patent Application Publication Laid-Open No. 2013-247817, a total sum of circuit losses of the PFC circuit and the DC/DC converter decides conversion efficiency as a whole.

Hereupon, in order to optimize the conversion efficiency of the whole system, Japanese Patent Application Publication Laid-Open No. 2013-247817 describes the charger control system having a configuration in which the DC voltage to be outputted and inputted from the PFC circuit is optimized upon charging and discharging of the battery, but merely describes the power factor correction (PFC) itself within the range of the well-known art.

SUMMARY

A power factor correcting device according to one embodiment of the present invention including a converter that converts, by switching, AC voltage into DC voltage, the AC voltage being inputted via a circuit with a capacitor through which reactive current flows, and a control unit that corrects a power factor of AC power inputted to the circuit by controlling switching by the converter, comprises: a voltage detection unit that detects a magnitude of AC voltage inputted to the converter; and a detection unit that detects a magnitude of AC current inputted to the converter or a magnitude of DC power outputted from the converter, and the control unit includes a first calculation unit that calculates a magnitude of reactive current flowing in the circuit with a phase advanced by $\pi/2$ from the AC voltage based on the magnitude detected by the voltage detection unit and capacitance of the capacitor, a second calculation unit that calculates a target value for a phase delay of the AC current with respect to the AC voltage based on the magnitude calculated by the first calculation unit and the magnitude detected by the detection unit, and a third calculation unit that calculates an operation amount for delaying a phase of the switching based on the target value calculated by the second calculation unit.

A power factor correcting device according to one embodiment of the present invention including a converter that converts, by switching, pulsating voltage obtained by full-wave rectifying AC voltage into DC voltage, the AC voltage being inputted via a circuit with a capacitor through which reactive current flows, and a control unit that corrects a power factor of AC power inputted to the circuit by controlling switching by the converter, comprises: a voltage detection unit that detects a magnitude of pulsating voltage inputted to the converter; and a detection unit that detects a magnitude of pulsating current inputted to the converter or a magnitude of DC power outputted from the converter, and the control unit comprises: a first calculation unit that calculates a magnitude of reactive current flowing in the circuit with a phase advanced by $\pi/2$ from the AC voltage based on the magnitude detected by the voltage detection unit and capacitance of the capacitor; a second calculation unit that calculates a target value for a phase delay of the pulsating current with respect to the pulsating voltage based on the magnitude calculated by the first calculation unit and the magnitude detected by the detection unit; and a third calculation unit that calculates an operation amount for delaying a phase of the switching based on the target value calculated by the second calculation unit.

A bidirectional AC/DC conversion apparatus according to one embodiment of the present invention comprises: the power factor correcting device described above; and a DC/DC converter that bidirectionally converts DC voltage, and the power factor correcting device has a full bridge circuit that is included in the converter and bidirectionally performs conversion between AC voltage and DC voltage.

A computer program according to one embodiment of the present invention executable by a control unit of a power factor correcting device including a converter that converts, by switching, AC voltage into DC voltage, the AC voltage being inputted via a circuit with a capacitor through which reactive current flows, a detection unit that detects a magnitude of AC current inputted to the converter or a magnitude of DC power outputted from the converter, a voltage detection unit that detects a magnitude of AC voltage inputted to the converter, and the control unit that corrects a power factor of AC power inputted to the circuit by controlling switching by the converter, causes the control unit to function as: a first calculation unit that calculates a magnitude of reactive current flowing in the circuit with a phase advanced by $\pi/2$ from the AC voltage based on the magnitude detected by the voltage detection unit and capacitance of the capacitor; a second calculation unit that calculates a target value for a phase delay of the AC current with respect to the AC voltage based on the magnitude calculated by the first calculation unit and the magnitude detected by the detection unit; and a third calculation unit that calculates an operation amount for delaying a phase of the switching based on the target value calculated by the second calculation unit.

Noted that as well as the present application may be achieved as a power factor correcting device and a bidirectional AC/DC conversion apparatus provided with such a characteristic processing unit and as a computer program causing the computer to execute such a characteristic processing, the present application may be achieved as a power factor correcting method for executing such characteristic processing by steps. Furthermore, the present invention allows a part or all of the power factor correcting device and the bidirectional AC/DC conversion apparatus to be achieved as a semiconductor integrated circuit, or can be achieved as another system including the power factor correcting device and the bidirectional AC/DC conversion apparatus.

The above and further objects and features will more fully be apparent from the following detailed description with accompanying drawings.

DETAILED DESCRIPTION

Figure 1:
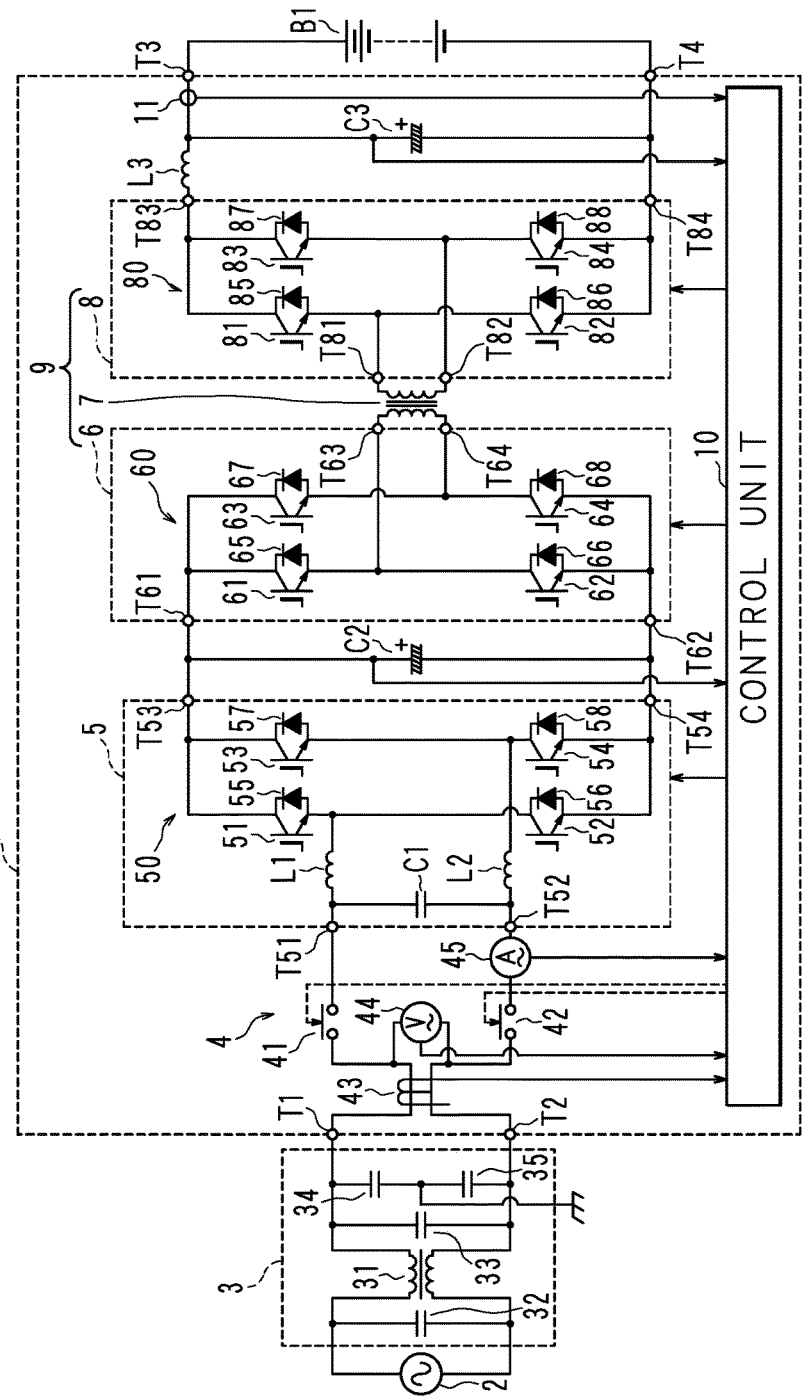
FIG. 1 is a circuit diagram illustrating an example of the configuration of a bidirectional AC/DC conversion apparatus according to Embodiment 1 of the present invention.

The technique disclosed in Japanese Patent Application Publication Laid-Open No. 2013-247817, however, has a problem that upon charging operation of the battery, AC voltage and AC current inputted to the PFC circuit are respectively detected by an AC voltage sensor and an AC current sensor that are connected between a filter circuit that is interposed across the input side of the AC power and the PFC circuit, and thus, reactive power caused by current with an advanced phase that is shunted to a capacitor in the filter circuit is not canceled out by the PFC circuit.

The present invention is made in view of the above-described problem, and an object is to provide a power factor correcting device that is capable of correcting the power factor of a total AC power including reactive power caused by current shunted to a capacitor in a circuit interposed across the input side of AC power, a bidirectional AC/DC conversion apparatus including the power factor correcting device and a computer program.

According to a disclosure of the present application, it is possible to correct the power factor of a total AC power including reactive power caused by current shunted to a capacitor in a circuit interposed across the input side of AC power.

First, embodiments of the present invention are listed and described. Noted that at least a part of the embodiments listed below may arbitrarily be combined.

(1) A power factor correcting device according to one embodiment of the present invention including a converter that converts, by switching, AC voltage into DC voltage, the AC voltage being inputted via a circuit with a capacitor through which reactive current flows, and a control unit that corrects a power factor of AC power inputted to the circuit by controlling switching by the converter, comprises: a voltage detection unit that detects a magnitude of AC voltage inputted to the converter; and a detection unit that detects a magnitude of AC current inputted to the converter or a magnitude of DC power outputted from the converter, and the control unit includes a first calculation unit that calculates a magnitude of reactive current flowing in the circuit with a phase advanced by $\pi/2$ from the AC voltage based on the magnitude detected by the voltage detection unit and capacitance of the capacitor, a second calculation unit that calculates a target value for a phase delay of the AC current with respect to the AC voltage based on the magnitude calculated by the first calculation unit and the magnitude detected by the detection unit, and a third calculation unit that calculates an operation amount for delaying a phase of the switching based on the target value calculated by the second calculation unit.

According to the present application, the advanced-phase reactive current is shunted to the capacitor in the circuit interposed across the input side of the AC voltage. When the converter converts AC voltage inputted via the circuit into DC voltage by switching by means of the switching elements, the power factor of the AC power inputted to the circuit is corrected by the control unit. The control unit calculates, by the first calculation unit, the magnitude of reactive current that flows through the capacitor with a phase advanced by $\pi/2$ from the AC voltage based on the magnitude of the AC voltage inputted to the converter and the capacitance of the capacitor in the circuit, calculates, by the second calculation unit, a target value for phase delay of the AC current in order to perform control such that the AC current becomes delayed-phase current that cancels out the above-described advanced-phase reactive current based on the calculated magnitude of the reactive current and the magnitude of the AC current inputted to the converter or the magnitude of the DC power outputted from the converter, and calculates, by the third calculation unit, an operation amount for delaying the phase of turning on and off of the switching elements of the converter based on the calculated target value.

Thus, depending on the magnitude of the AC voltage and the magnitude of the AC current that are inputted to the converter or the magnitude of the input AC voltage and the magnitude of the output DC power as well as the capacitance of the capacitor, the operation amount for delaying the phase of turning on and off of the switching elements by the converter is calculated in order to cancel out the advanced-phase reactive current shunted to the capacitor, and the amount of phase delay of the AC current inputted to the converter is controlled in accordance with the calculated operation amount.

(2) A power factor correcting device according to one embodiment of the present invention including a converter that converts, by switching, pulsating voltage obtained by full-wave rectifying AC voltage into DC voltage, the AC voltage being inputted via a circuit with a capacitor through which reactive current flows, and a control unit that corrects a power factor of AC power inputted to the circuit by controlling switching by the converter, comprises: a voltage detection unit that detects a magnitude of pulsating voltage inputted to the converter; and a detection unit that detects a magnitude of pulsating current inputted to the converter or a magnitude of DC power outputted from the converter, and the control unit comprises: a first calculation unit that calculates a magnitude of reactive current flowing in the circuit with a phase advanced by $\pi/2$ from the AC voltage based on the magnitude detected by the voltage detection unit and capacitance of the capacitor; a second calculation unit that calculates a target value for a phase delay of the pulsating current with respect to the pulsating voltage based on the magnitude calculated by the first calculation unit and the magnitude detected by the detection unit; and a third calculation unit that calculates an operation amount for delaying a phase of the switching based on the target value calculated by the second calculation unit.

According to the present application, the advanced-phase reactive current is shunted to the capacitor in the circuit interposed across the input side of the AC voltage. When the converter converts pulsating voltage, which is obtained by full-wave rectifying AC voltage inputted via the circuit, into DC voltage by switching by means of the switching element, the power factor of the AC power inputted to the circuit is corrected by the control unit. The control unit calculates, by the first calculation unit, a magnitude of reactive current flowing in the capacitor with a phase advanced by $\pi/2$ from the AC voltage based on the magnitude of the pulsating voltage inputted to the converter and the capacitance of the capacitor in the circuit, calculates, by the second calculation unit, a target value for phase delay of the pulsating current in order to perform control such that the pulsating current becomes delayed-phase current that cancels out the above-described advanced-phase reactive current based on the calculated magnitude of the reactive current and the magnitude of the pulsating current inputted to the converter or the magnitude of the DC power outputted from the converter, and calculates, by the third calculation unit, an operation amount for delaying the phase of turning on or off of the switching element of the converter based on the calculated target value.

Thus, depending on the magnitude of the pulsating voltage and the magnitude of the pulsating current that are inputted to the converter or the magnitude of the inputted pulsating voltage and the magnitude of the outputted DC power as well as the capacitance of the capacitor, the operation amount for delaying the phase of turning on and off of the switching element of the converter is calculated in order to cancel out the advanced-phase reactive current shunted to the capacitor, and the amount of phase delay of the pulsating current inputted to the converter is controlled in accordance with the calculated operation amount.

(3) It is preferable that the third calculation unit calculates an operation amount reduced as the magnitude detected by the detection unit becomes smaller than a reference value.

According to the present application, as the magnitude of the AC current inputted to the converter or the magnitude of the DC power outputted from the converter are small as compared to the reference value, the operation amount for delaying the phase of turning on/off of the switching elements of the converter is reduced.

Accordingly, when the current inputted to the converter or the power outputted from the converter is relatively small as compared to the advanced-phase reactive current shunted to the above-described capacitor, it is possible to avoid the situation where the AC current with a delayed phase corresponding to the operation amount becomes current in an opposite direction on calculation.

(4) It is preferable that the third calculation unit calculates an operation amount reduced at a predetermined ratio.

In addition, according to the present application, the operation amount obtained by further reducing the operation amount calculated by the third calculation unit at a predetermined ratio is regarded as a calculation result by the third calculation unit.

Accordingly, it is possible to reduce the total harmonic distortion at some penalty in the power factor correction.

(5) It is preferable that the third calculation unit regards a first operation amount as the calculated operation amount in a case where the calculated operation amount is larger than the first operation amount.

According to the present application, when the operation amount calculated by the third calculation unit is larger than the first operation amount, the first operation amount is regarded as a calculation result by the third calculation unit.

Accordingly, even when the current inputted to the converter or the power outputted from the converter is reduced, which increases the operation amount, the upper limit of the operation amount is restricted to the first operation amount, and thus it is possible to avoid the situation where the delayed-phase AC current corresponding to the operation amount becomes current in an opposite direction on calculation.

(6) It is preferable that the third calculation unit regards a second operation amount as the calculated operation amount in a case where the magnitude detected by the detection unit is smaller than a predetermined threshold.

According to the present application, when the magnitude of the AC current inputted to the converter or the magnitude of the DC power outputted from the converter is smaller than the predetermined threshold, the predetermined second operation amount is regarded as a calculation result by the third calculation unit.

Accordingly, when the magnitude of the current inputted to the converter or the magnitude of the power outputted from the converter is reduced to become smaller than the predetermined threshold, by the operation amount being fixed to the second operation amount, it is possible to provide a certain extent of the effect of the power factor correction and to avoid the situation where the delayed-phase AC current corresponding to the operation amount becomes current in an opposite direction on calculation.

(7) A bidirectional AC/DC conversion apparatus according to one embodiment of the present invention comprises the power factor correcting device described above and a DC/DC converter that bidirectionally converts DC voltage, and the power factor correcting device has a full bridge circuit that is included in the converter and bidirectionally performs conversion between AC voltage and DC voltage.

According to the present application, the power factor correcting device performs bidirectional conversions between AC and DC by using the full bridge circuit, and the DC/DC converter performs bidirectional conversions into DC voltage toward the outside and into DC voltage toward the power factor correcting device.

Accordingly, the power factor correcting device that corrects the power factor of the total AC power including the reactive power due to the current shunted to the capacitor in the circuit interposed across the input side of the AC power can be applied to the bidirectional AC/DC conversion apparatus.

(8) A computer program according to one embodiment of the present invention executable by a control unit of a power factor correcting device including a converter that converts, by switching, AC voltage into DC voltage, the AC voltage being inputted via a circuit with a capacitor through which reactive current flows, a detection unit that detects a magnitude of AC current inputted to the converter or a magnitude of DC power outputted from the converter, a voltage detection unit that detects a magnitude of AC voltage inputted to the converter, and the control unit that corrects a power factor of AC power inputted to the circuit by controlling switching by the converter, causes the control unit to function as: a first calculation unit that calculates a magnitude of reactive current flowing in the circuit with a phase advanced by $\pi/2$ from the AC voltage based on the magnitude detected by the voltage detection unit and capacitance of the capacitor; a second calculation unit that calculates a target value for a phase delay of the AC current with respect to the AC voltage based on the magnitude calculated by the first calculation unit and the magnitude detected by the detection unit; and a third calculation unit that calculates an operation amount for delaying a phase of the switching based on the target value calculated by the second calculation unit.

According to the present application, the computer executing a computer program by a control unit is caused to function as the first calculation unit that calculates a magnitude of reactive current flowing in the capacitor with a phase advanced by $\pi/2$ from the AC voltage based on the magnitude of the AC voltage inputted to the converter and capacitance of the capacitor in the circuit; the second calculation unit that calculates a target value for a phase delay of AC current in order to perform control such that the AC current becomes delayed-phase current that cancels out the above-described advanced-phase reactive current based on the calculated magnitude of the reactive current and the magnitude of AC current inputted to the converter or the magnitude of DC power outputted from the converter; and the third calculation unit that calculates an operation amount for delaying the phase of turning on and off of the switching elements of the converter based on the calculated target value.

Thus, depending on the magnitude of the AC voltage and the magnitude of the AC current that are inputted to the converter or the magnitude of the inputted AC voltage and the magnitude of the outputted DC power as well as the capacitance of the capacitor, the operation amount for delaying the phase of turning on and off of the switching elements of the converter is calculated in order to cancel out the advanced-phase reactive current shunted to the capacitor, and the amount of phase delay of the AC current inputted to the converter is controlled in accordance with the calculated operation amount.

Examples of a power factor correcting device, a bidirectional AC/DC conversion apparatus and a computer program according to embodiments of the present invention will be described below in detail with reference to the drawings. It is to be understood that the embodiments herein disclosed are illustrative in all respects and not restrictive, and all changes that fall within the meanings and bounds are intended to be embraced by the claims. Furthermore, technical features described in the embodiments may be combined with each other.

Embodiment 1

FIG. 1 is a circuit diagram illustrating an example of the configuration of a bidirectional AC/DC conversion apparatus according to Embodiment 1 of the present invention. The reference numeral 1 in the drawing denotes a bidirectional AC/DC conversion apparatus, and the bidirectional AC/DC conversion apparatus 1 is an isolated conversion apparatus that is mounted on a motorized vehicle such as a plug-in hybrid electric vehicle and an electric vehicle, and is for performing bidirectional conversions between AC voltage and DC voltage.

AC input/output terminals T1 and T2 of the bidirectional AC/DC conversion apparatus 1 are connected to public electricity 2 and an electric load (not illustrated) via a charging cable that is capable of being attached to and detached from an inlet of the motorized vehicle (both of which are not illustrated) and a noise filter 3. DC input/output terminals T3 and T4 of the bidirectional AC/DC conversion apparatus 1 are respectively connected to a plus terminal and a minus terminal of a battery B1.

The noise filter (corresponding a circuit with a capacitor through which reactive current flows) 3 includes two pairs of input/output terminals that are connected to each other via a common mode choke coil 31. A capacitor 32 is connected across one of the pair of input/output terminals on the public electricity 2 side while a capacitor 33 is connected across the other of the pair of input/output terminals on the AC input/output terminals T1 and T2 side. A series circuit including capacitors 34 and 35 for removing high frequency noise is further connected across the input/output terminals on the AC input/output terminals T1 and T2 side, and a connection point of the capacitors 34 and 35 is connected to a ground potential. Capacitive reactance is dominant as impedance when viewed from each of the input/output terminals of the noise filter 3 although impedance is not limited to the capacitive reactance.

The bidirectional AC/DC conversion apparatus 1 includes an input/output unit 4 that inputs and outputs AC power from and to the AC input/output terminals T1 and T2, a converter 5 that has AC input/output terminals T51 and T52 connected to the input/output unit 4 and that performs bidirectional conversions between AC voltage and DC voltage, a converter 9 that has DC input/output terminals T61 and T62 respectively connected to DC input/output terminals T53 and T54 of the converter 5 and that bidirectionally converts the DC voltage, and a control unit 10 that controls voltage conversion by the converter 5 and the converter 9. The DC input/output terminals T53 and T54 of the converter 5 and the DC input/output terminals T61 and T62 of the converter 9 are respectively connected while having a capacitor C2 for smoothing DC voltage interposed therebetween. The DC voltage across the capacitor C2 is detected by a voltage sensor integrated in the control unit 10. The control unit 10 is a digital signal processor (DSP), for example.

The input/output unit 4 includes relay contacts 41 and 42 respectively connected, at each ends, to the AC input/output terminals T1 and T2, a zero-phase current transformer (ZCT) 43 for detecting current leakage of AC power inputted and outputted to and from the AC input/output terminals T1 and T2, an AC voltage detecting unit (corresponding to voltage detection unit) 44 for detecting AC voltage inputted and outputted to and from the converter 5 and an AC current detecting unit (corresponding to a detection unit that detects a magnitude of the AC power) 45.

One ends of the detection terminals of the zero-phase current transformer 43, the AC voltage detecting unit 44 and the AC current detecting unit 45 are connected to the control unit 10. The relay contacts 41 and 42 are turned on and off by the control unit 10. The other end of the relay contact 41 is connected to the AC input/output terminal T51. The other end of the relay contact 42 is connected to the AC input/output terminal T52 via the AC current detecting unit 45. The AC current detecting unit 45 is a current transformer (CT), for example, and detects current flowing in the relay contact 42, but may detect current flowing in the relay contact 41.

The converter 9 includes inverters 6 and 8 that perform bidirectional conversions between DC voltage and AC voltage and a matching transformer 7 that connects the inverter 6 with the inverter 8. The matching transformer 7 is isolated between the primary side and the secondary side and is connected to AC input/output terminals T63 and T64 of the inverter 6 on the primary side while connected to AC input/output terminals T81 and T82 of the inverter 8 on the secondary side. One DC input/output terminals T61 and T62 of the converter 9 also serve as the DC input/output terminals T61 and 62 of the inverter 6 while the other DC input/output terminals T83 and T84 of the converter 9 also serve as the DC input/output terminals T83 and T84 of the inverter 8.

The other DC input/output terminals T83 and T84 of the converter 9 are connected to a series circuit formed by an inductor L3 and a capacitor C3 for smoothing the DC voltage converted by the converter 9 in a second direction (from the DC input/output terminals T61 and T62 to the DC input/output terminals T83 and T84). The both ends of the capacitor C3 are connected across the DC input/output terminals T3 and T4. The DC current inputted and outputted to and from the DC input/output terminals T 83 and T84 by the converter 9 is detected by a current sensor 11 having a detection terminal connected to the control unit 10. The DC voltage inputted and outputted to and from the DC input/output terminals T 83 and T84 by the converter 9, that is, the voltage across the capacitor C3 is detected by the voltage sensor integrated in the control unit 10.

The converter 5 includes inductors L1 and L2 having one ends that are respectively connected to the AC input/output terminals T51 and T52 and a full bridge circuit 50 using switching elements such as an insulated gate bipolar transistor (IGBT), a metal-oxide semiconductor field effect transistor (MOSFET) or the like. In Embodiment 1, IGBTs 51, 52, 53 and 54 are utilized as switching elements. Across the AC input/output terminals T51 and T52, a capacitor C1 for removing noise from the AC voltage that is converted by the converter 5 is connected.

The other end of the inductor L1 is connected to an emitter of the IGBT 51 and connected to a collector of the LGBT 52. The other end of the inductor L2 is connected to an emitter of the IGBT 53 and connected to a collector of the IGBT 54. Collectors of the IGBTs 51 and 53 are connected to the DC input/output terminal T53 of the converter 5. Emitters of the IGBTs 52 and 54 are connected to the DC input/output terminals T54 of the converter 5. Diodes 55, 56, 57 and 58 are respectively connected in antiparallel between the collectors and the emitters of the IGBTs 51, 52, 53 and 54.

In the case where the converter 5 converts AC voltage to DC voltage, it performs switching on the AC voltage inputted from the AC input/output terminals T51 and T52 to the one ends of the inductors L1 and L2 by the IGBT 52 (or 54) and outputs DC voltage induced at the inductors L1 and L2 to the DC input/output terminals T53 and T54 via the diodes 55 and 58 (or 57 and 56). In the case where the converter 5 converts DC voltage into AC voltage, it alternately inverts in polarity the DC voltage applied to the DC input/output terminals T53 and T54 by alternately turning on and off of the IGBTs 51 and 54 as well as the IGBTs 53 and 52 and outputs inverted one from the AC output terminals T51 and T52.

The inverter 6 has a full bridge circuit 60 constructed by IGBTs 61, 62, 63 and 64. The DC input/output terminal T61 of the inverter 6 is connected to collectors of the IGBTs 61 and 63. The DC input/output terminal T62 of the inverter 6 is connected to emitters of the IGBTs 62 and 64. An emitter of the IGBT 61 and a collector of the IGBT 62 are connected to the AC input/output terminal T63 of the inverter 6. An emitter of the IGBT 63 and a collector of the IGBT 64 are connected to the AC input/output terminal T64 of the inverter 6. Diodes 65, 66, 67 and 68 are respectively connected in antiparallel between the collectors and the emitters of the IGBTs 61, 62, 63 and 64.

In the case where the inverter 6 converts DC voltage into AC voltage, the control unit 10 inverts in polarity the DC voltage applied to the DC input/output terminals T61 and T62 by alternately turning on and off of the IGBTs 61 and 64 as well as the IGBTs 63 and 62 using a driving unit (not illustrated)(this applies to the following) and outputs the inverted one from the AC output terminals T63 and T64. The AC voltage is applied to the input/output terminals T81 and T82 of the inverter 8 via the matching transformer 7. In the case where the inverter 6 converts AC voltage into DC voltage, the AC voltage applied to the AC input/output terminals T63 and T64 is full-wave rectified by a diode bridge formed by the diodes 65, 66, 67 and 68 during the control unit 10 turning off the IGBTs 61, 62, 63 and 64, and is outputted from the DC input/output terminals T61 and T62.

The inverter 8 is a full bridge circuit 80 constructed by IGBTs 81, 82, 83 and 84. The AC input/output terminal T81 of the inverter 8 is connected to an emitter of the IGBT 81 and a collector of the IGBT 82. The AC input/output terminal T82 of the inverter 8 is connected to an emitter of the IGBT 83 and a collector of the IGBT 84. Collectors of the IGBTs 81 and 83 are connected to the DC input/output terminal T83 of the inverter 8. Emitters of the IGBTs 82 and 84 are connected to the DC input/output terminal T84 of the inverter 8. Diodes 85, 86, 87 and 88 are respectively connected in antiparallel between the collectors and the emitters of the IGBTs 81, 82, 83 and 84.

In the case where the inverter 8 converts AC voltage into DC voltage, the AC voltage applied to the AC input/output terminals T81 and T82 is full-wave rectified by a diode bridge formed by the diodes 85, 86, 87 and 88 during the control unit 10 turning off the IGBTs 81, 82, 83 and 84, and is outputted from the DC input/output terminals T83 and T84. In the case where the inverter 8 converts DC voltage into AC voltage, by the control unit 10 alternately turning on and off of the IGBTs 81 and 84 as well as the IGBTs 83 and 82, the DC voltage applied to the DC input/output terminals T83 and T84 is alternately inverted in polarity and is outputted from the AC output terminals T81 and T82. The AC voltage is applied to the input/output terminals T63 and T64 of the inverter 6 via the matching transformer 7.

The control unit 10 performs on/off control on the conversion by the converter 5 and control on the direction of the conversion by the converter 5 by performing on/off control of the IGBTs 51, 52, 53 and 54. The control unit 10 performs control on the direction of the conversion by the converter 9 including the inverters 6 and 8 by performing control such that turning on/off of the IGBTs 61, 62, 63 and 64 is brought into association with turning on/off of the IGBTs 81, 82, 83 and 84. That is, in the case where the direction of the conversion by the converter 9 is assumed to be a first direction (directing from the DC input/output terminals T83 and T84 to the DC input/output terminals T61 and T62), the control unit 10 causes the inverter 8 to convert DC voltage into AC voltage while causing the inverter 6 to convert AC voltage into DC voltage. Alternatively, in the case where the direction of the conversion by the converter 9 is assumed to be a second direction, the control unit 10 causes the inverter 6 to convert DC voltage into AC voltage while causing the inverter 8 to convert AC voltage into DC voltage.

The control unit 10 further match the direction of the conversion by the converter 5 to the direction of the conversion by the converter 9 by performing control such that turning on/off of the IGBTs 51, 52, 53 and 54, turning on/off of the IGBTs 61, 62, 63 and 64 and turning on/off of the IGBTs 81, 82, 83 and 84 are brought into association with one another. That is, in the case where AC voltage is converted into DC voltage by the bidirectional AC/DC conversion apparatus 1, the control unit 10 causes the converter 5 to convert AC voltage to DC voltage and sets the direction of the conversion by the converter 9 to the second direction. In the case where DC voltage is converted into AC voltage by the bidirectional AC/DC conversion apparatus 1, the control unit 10 sets the direction of the conversion by the converter 9 to the first direction and causes the converter 5 to convert DC voltage into AC voltage.

In the case where the battery B1 is charged or discharged according to the above-described configuration, the relay contacts 41 and 42 are first turned on. Here, in the case where current leakage is detected by the zero-phase current transformer 43 during the relay contacts 41 and 42 being turned on, the relay contacts 41 and 42 are turned off. Then, the control unit 10 causes the bidirectional AC/DC conversion apparatus 1 to work as an AC/DC converter or a DC/AC inverter by performing control based on an instruction signal received through a communication interface (not illustrated) from an electronic control unit (ECU), for example. Here, the DC voltage sent and received between the converter 5 and the converter 9 is detected as voltage across the capacitor C2 by the voltage sensor integrated in the control unit 10.

In the case where the control unit 10 is notified of a charging instruction for the battery B1, the control unit 10 causes the converter 5 to convert AC voltage into DC voltage by using a driving unit although not illustrated (the same applies to the following description) and sets the direction of the conversion by the converter 9 to the second direction. Thus, AC voltage inputted from the AC input/output terminals T1 and T2 is converted into DC voltage, and by the converted DC voltage outputted from the DC input/output terminals T3 and T4, the battery B1 is charged. The DC voltage and the DC current supplied to the battery B1 are detected by the voltage sensor integrated in the control unit 10 and the current sensor 11. The DSP in the control unit 10 turns on and off the IGBTs of the converter 5 and the converter 9 such that the detected DC voltage and DC current coincide with a target voltage and a target current, respectively. The detail thereof will not be described.

In the case where the control unit 10 is notified of a discharging instruction for the battery B1, the control unit 10 sets the direction of the conversion by the converter 9 to the first direction and causes the converter 5 to convert DC voltage into AC voltage. Thus, the DC voltage inputted from the battery B1 to the DC input/output terminals T3 and T4 is converted into the AC voltage, and the converted AC voltage is supplied to the public electricity 2 or an electric load (not illustrated), which is supplied with power from the public electricity 2, via the AC input/output terminals T1 and T2 and the noise filter 3. The DC current supplied from the battery B1 is detected by the current sensor 11. The DSP in the control unit 10 turns on and off the IGBTs of the converter 5 and the converter 9 such that the detected current coincides with a target current. The detail thereof will not be described. The detail of control on interconnection of power system required here will also not be described.

Successively, the following describes a power factor correcting device (PFC circuit) achieved by the input/output unit 4, the converter 5 and the control unit 10.

Figure 2:
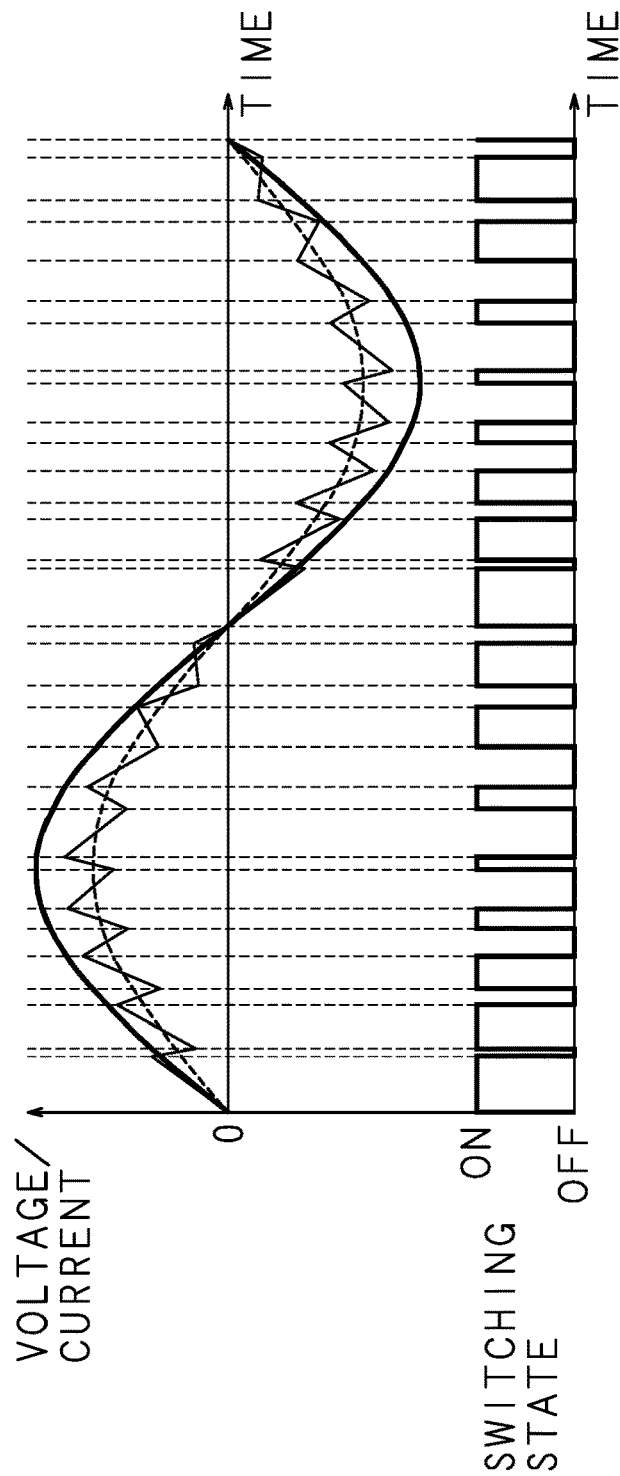
FIG. 2 is an illustrative view schematically illustrating AC voltage and AC current that are inputted to a power factor correcting device and switching timings by a converter.

FIG. 2 is an illustrative view schematically illustrating AC voltage and AC current that are inputted to the power factor correcting device and switching timings by the converter 5. At the top of FIG. 2, AC voltage and AC current that are inputted to the converter 5 via the input/output unit 4 and an movement average of the AC current are respectively depicted by a bold solid line, a thin solid line and a dotted line. At the bottom thereof, the timings when the IGBT 52 or 54 in the converter 5 are turned on are depicted by a solid line. In the drawing, the vertical axis represents voltage, current or a switching state while the horizontal axis represents time. Here, the polarity of the AC voltage is assumed to be positive in the case where the voltage of the AC input/output terminal T52 is higher than that of the input/output terminal T51 while the polarity of the AC current is assumed to be positive in the case where current flows from the AC input/output terminal T51 to the converter 5.

FIG. 2 illustrates a PFC in a current continuous mode as an example, but the same description applies to even a current critical mode and a current discontinuous mode. In Embodiment 1, since the frequency of the AC voltage inputted to the converter 5 is 60 Hz and the switching frequency by the converter 5 is approximately 50 kHz, 833 times of switching occurs per one cycle of the AC voltage. Description is, however, will schematically be made assuming that 16 times switching occurs in FIG. 2.

In the case where the AC voltage inputted to the converter 5 is positive, that is, in the case of a half-cycle represented by the left half of the cycle in FIG. 2 (phase from 0 to π), when the IGBT 52 is turned on, current flows from the AC input/output terminal T51 via the inductor L1, the IGBT 52, the diode 58 and the inductor L2 (positive current in FIG. 2). The current in this case linearly increases by the inductive reactance of the inductors L1 and L2 at an increasing speed substantially proportional to the positive AC voltage. In contrast, when the IGBT 52 is turned off, current decreases with the lapse of time while flowing from the AC input/output terminal T51 through the inductor L1, the diode 55, the circuits downstream of the capacitor C2 toward the battery B1 back to the diode 58 and the inductor L2.

In the case where the AC voltage inputted to the converter 5 is negative, that is, in a case of a half-cycle represented by the right half of the cycle in FIG. 2 (phase from π to 2π), when the IGBT 54 is turned on, current flows from the AC input/output terminal T52 through the inductor L2, the IGBT 54, the diode 56 and the inductor L1 (negative current in FIG. 2). The absolute of current in this case linearly increases by the inductive reactance of the inductors L1 and L2 at an increasing speed substantially proportional to the absolute of the negative AC voltage. In contrast, when the IGBT 54 is turned off, the absolute value of the current decreases with the lapse of time while current flows from the AC input/output terminal T52 through the Inductor L2, the diode 57, the circuits downstream of the capacitor C2 toward the battery B1 back to the diode 56 and the inductor L1.

In the current continuous mode, the switching by the converter 5 is controlled such that the movement average of the AC current represented by dashed lines is proportional to the AC voltage. As a result, the duty at a time when the IGBT 52 or 54 is switched is maximized at a phase angle of 0 and π of each cycle of AC voltage while being minimized at a phase angle of π/2 and 3π/2 of each cycle of AC voltage. Noted that this is an example in the case of the current continuous mode. For example, in the current critical mode, the duty at a time when the IGBT 52 or 54 is switched is made constant, and the AC current is adjusted by changing the cycle of switching in correspondence with the AC voltage.

Generally, the power factor correcting device performs control such that the AC current detected by the AC current detecting unit 45 is changed in phase with the AC voltage detected by the AC voltage detecting unit 44. The AC current detected here does not include the current shunted to the capacitors 32, 33, 34 and 35 of the noise filter 3. However, the current shunted to the capacitors 32, 33, 34 and 35 is reactive current that advances the AC voltage detected by the AC voltage detecting unit 44 by π/2 in phase. As the magnitude of the AC current inputted to the converter 5 is reduced and close to the magnitude of the reactive current, the power factor of the total AC current supplied from the public electricity 2 through the noise filter 3 is reduced.

Hence, in Embodiment 1, the AC current detected by the AC current detecting unit 45 is adjusted so as to be delayed-phase AC current with respect to the AC voltage detected by the AC voltage detecting unit 44 in order to cancel out the advanced-phase reactive current shunted to the capacitors 32, 33, 34 and 35. More specifically, the DSP calculates a target value for the phase delay in the state where the timing of turning on and off of the IGBT 52 or 54 is controlled such that the power factor of the AC power inputted to the converter 5 included in the power factor correcting device is closer to 1 and then calculates an operation amount for delaying the timing of turning on and off of the IGBT 52 or 54 in accordance with the calculated target value. The following describes a method of calculating the target value and the operation amount in detail.

The AC voltage Vac of the public electricity 2, that is, the AC voltage detected by the AC voltage detecting unit 44 is represented by the following Equation (1). Furthermore, the AC current iL flowing into the converter 5, that is, the AC current detected by the AC current detecting unit 45 is represented by the following Equation (2).

$$Vac = E \sin(2\pi f t) \tag{1}$$

$$iL = I \sin(2\pi f t + \theta) \tag{2}$$

where
E: peak value of the AC voltage of the public electricity 2 (corresponding to the magnitude of AC voltage×√2)
I: peak value of the AC current flowing into the converter 5 (corresponding to the magnitude of AC current×√2)
f: frequency of the public electricity 2 (Hz)
t: time
θ: phase delay In the case where I of Equation (2) is evaluated from the peak value of the AC current detected by the AC current detecting unit 45, I is a value before the phase adjustment by switching is performed by the converter 5, and thus I may not be a suitable value. Furthermore, in the case where control of the power factor correcting device is performed without using the AC current detecting unit 45, I needs to be evaluated by another means. In this case, the following Equations (3) and (4) are established and thus, by substituting the left side of Equation (4) into the right side of Equation (3), I may be calculated from the following Equation (5) obtained. Thus, I is indirectly calculated based on the magnitude of the output power of the converter 5. Noted that in Equation (5), cos θ=1 and the efficiency of the converter 5=1 may be established for the sake of simplicity.

$$\text{Output power of the converter 5} = \text{input power of the converter 5} \times \text{efficiency of the converter 5} \tag{3}$$

$$\text{Input power of the converter 5} = (E/\sqrt{2})(I/\sqrt{2})\cos\theta \tag{4}$$

$$I = \text{output power of the converter 5} \times 2/(\text{efficiency of the converter 5} \times E \cos\theta) \tag{5}$$

The capacitive reactance of the noise filter 3 when viewed from the public electricity 2 is assumed to be 1/2πfC for the sake of simplicity. C is generally a combined capacitance (F) of the capacitors 32, 33, 34 and 35, but C subtracted by the inductive reactance caused by the common mode choke coil 31 may be evaluated, or C may precisely be evaluated by actual measurement in advance. The advanced-phase reactive current iC shunted to the noise filter 3 from the public electricity 2 is calculated by the following Equation (6). Thus, the total AC current iac flowing from the public electricity 2 via the noise filter 3 is represented by the following Equation (7).

$$iC = (2\pi f CE)\cos(2\pi f t) \tag{6}$$

$$iac = iC + iL \tag{7}$$

where
2 πfCE: peak value of reactive current (corresponding to the magnitude of reactive current×√2)

By substituting the left sides of Equation (6) and (2) into the right side of Equation (7) and applying the addition formula for a trigonometric function to be substituted Equation (7), Equation (7) is changed to Equation (8).

$$iac=(2\pi fCE)\cos(2\pi ft)+I\sin(2\pi ft+\theta)=(I\cos\theta)\sin(2\pi ft)+(2\pi fCE+I\sin\theta)\cos(2\pi ft) \quad (8)$$

If the coefficient of cos (2 πft) in the right side of Equation (8) that is finally obtained is 0, the total AC current iac becomes in phase with the AC voltage Vac of the public electricity 2, and thus, the power factor of the total AC power including the current shunted to the capacitors 32, 33, 34 and 35 in the noise filter 3 is corrected. That is, the target value θa for the phase delay θ is calculated from the following equation (9).

$$\theta a=-\arcsin(2\pi fCE/I) \quad (9)$$

The operation amount described above is calculated by any one of α1, α2, α3 and α4 respectively represented by the following Equations (10), (11), (12) and (13) such that the phase delay of the AC current detected by the AC current detecting unit 45 takes a value as close as possible to the target value θa for the phase delay represented by Equation (9).

$$\alpha 1 = f\text{count} \times (\theta a/2\pi)/2 \quad (10)$$

$$\alpha 2 = \alpha 1 \times (\text{Target/BaseValue}) \quad (11)$$

$$\alpha 3 = \alpha 2 \times \text{Adjustment} \quad (12)$$

$$\alpha 4 = \alpha 1 \times \text{Adjustment} \quad (13)$$

where
fcount=833 (the number of switching times per a cycle of AC voltage)
Target: magnitude of output power of the converter 5
BaseValue: reference value for power
Adjustment: reduction coefficient in the range of 0.2-0.5 (0.4 is taken here)

The operation amount α1 calculated by Equation (10) is theoretically an optimum operation amount for correcting the power factor of the above-described total AC power and is preferably applied to the case where the output power of the converter 5 is larger than a reference value for power. For example, the magnitude of iL around the value when the ratio of the magnitude of iC to the magnitude of iac is larger than 20% is regarded as a reference value for current, and the output power at this time is regarded as the reference value for power. In Embodiment 1, in the case where the magnitude of the AC voltage of the public electricity 2 (effective value) is 240 V ac, the reference value for power is 800 W. The reason why the right side of Equation (10) is divided by 2 is that since the adjustment of the operation amount is executed every half cycle of the AC voltage, the number of switching times during the half cycle is made 833/2. In the case where the output power of the converter 5 is larger than the reference value for power, the operation amount α1 calculated by Equation (10) is relatively a very small value, and thus, α1=0 may be possible (which means no adjustment is performed).

The operation amount α2 calculated by Equation (11) is preferably applied to the case where the output power of the converter 5 is smaller than the reference value for power. This is for avoiding a situation where the advanced-phase reactive power is no longer able to be canceled out by the delayed phase AC power flowing into the converter 5 in the case where the magnitude of the output power of the converter 5 is close to the magnitude of the reactive power caused by the advanced-phase current shunt to the capacitors 32, 33, 34 and 35.

Noted that the right side of Equation (11) (Target/BaseValue) may be replaced by (Target/BaseValue)×(X is a positive real number). The magnitude of the apparent power inputted to the converter 5, that is, the multiplication of the magnitude of the AC voltage detected by the AC voltage detecting unit 44 by the AC current detected by the AC current detecting unit 45 may be applied to Target. In any case, according to Equation (11), the ideal operation amount α1 calculated by Equation (10) is reduced as the magnitude of power inputted to and outputted from the converter 5 decreases. In other words, it can be said that the operation amount is reduced as the magnitude of the AC current inputted to the converter 5 is reduced since the magnitude of the AC voltage of the public electricity 2 is substantially constant. Thus, (Target/BaseValue) in Equation (11) may be calculated as a ratio of the magnitude of the AC current inputted to the converter 5 to the above-described reference value for current.

The operation amounts α3 and α4 respectively calculated by Equations (12) and (13) are preferably applied to the case where correction of the power factor of the AC power supplied from the public electricity 2 through the noise filter 3 as well as reduction in total harmonic distortion (THD) are further required.

The following describes the above-described operation by the control unit 10 by using a flowchart depicting thereof. The processing depicted below is executed by the DSP constructing the control unit 10 repeating a multiply-and-accumulate operation and determination processing according to the program previously stored in a program memory. Noted that the detail of adjustment processing of actually delaying the timing of turning on/off of each of the IGBTs by the control unit 10 based on the calculated operation amount will not be described.

Figure 3:
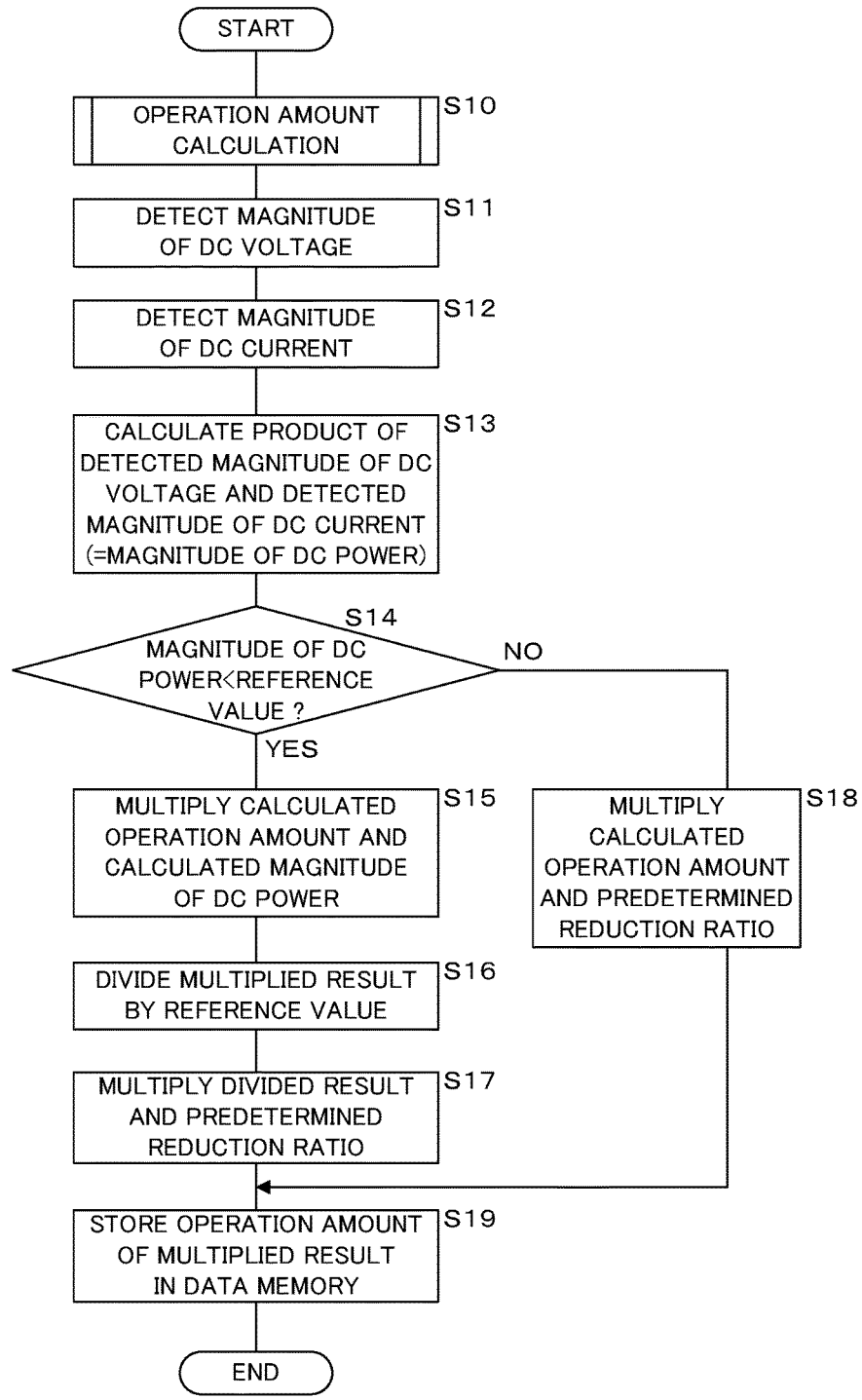
FIG. 3 is a flowchart of a processing procedure by a DSP for calculating an operation amount for delaying switching in the power factor correcting device according to Embodiment 1 of the present invention.
Figure 4:
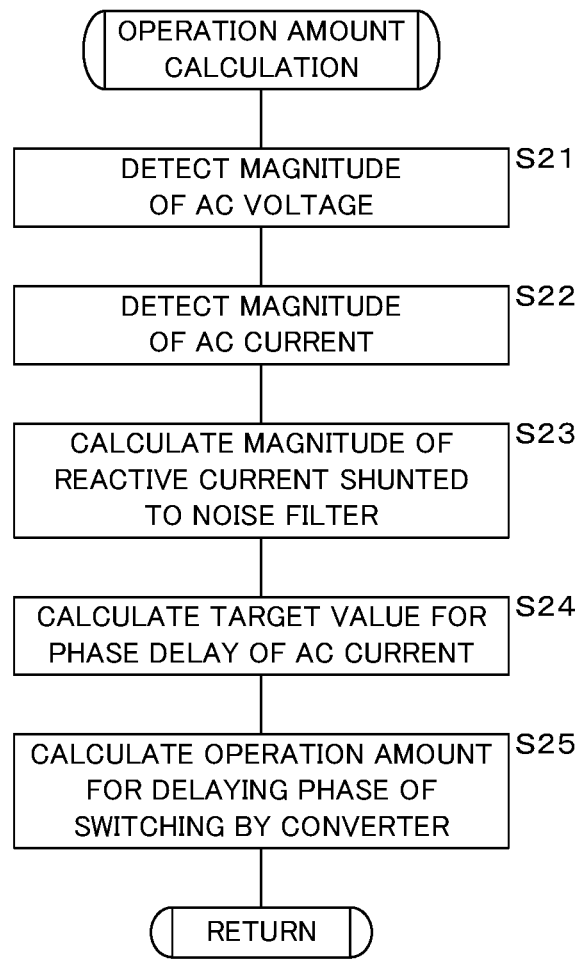
FIG. 4 is a flowchart of a processing procedure by the DSP in relation to a subroutine for operation amount calculation.

FIG. 3 is a flowchart of a processing procedure by the DSP for calculating an operation amount for delaying switching in the power factor correcting device according to Embodiment 1 of the present invention. FIG. 4 is a flowchart of a processing procedure by the DSP in relation to a subroutine for operation amount calculation. The processing in FIG. 3 is activated every cycle of the AC voltage of public electricity 2, for example.

When the processing in FIG. 3 is activated, the DSP invokes a subroutine in relation to the operation amount calculation in order to calculate an operation amount α1 represented by the above-described Equation (10) (S10). When the DSP returns the subroutine, the DSP detects the magnitude of DC voltage outputted from the converter 9 (S11) while detecting the magnitude of DC current outputted from the converter 9 by the current sensor 11 (S12), and calculates the product of the detected magnitude of the DC voltage and the detected magnitude of the DC current (S13: corresponding a detection unit for detecting the magnitude of DC power). The product is the magnitude of DC power called "Target" in Equation (11). Here, the magnitude of the output power of the converter 9 is regarded as the output power of the converter 5. However, the output power of the converter 5 may be increased in view of the conversion efficiency of the converter 9. Alternatively, the magnitude of the DC power outputted from the converter 5 may directly be detected by the detection circuit.

Successively, the DSP determines whether or not the calculated magnitude of the DC power is smaller than the reference value (S14). If it is small (S14: YES), the operation amount α1 calculated in the subroutine and the magnitude of the calculated DC power are multiplied (S15). Furthermore, the DSP divides the multiplied value by the reference value (S16: corresponding a third calculation unit for calculating a reduced operation amount) to thereby calculate an operation amount α2 represented in Equation (11) and then multiplies the divided value by a predetermined reduction ratio "Adjustment" (S17: corresponding to the third calculation unit for calculating an operation amount reduced at a predetermined ratio) to calculate an operation amount α3 represented in Equation (12).

Meanwhile, if the calculated magnitude of the DC power is not smaller than the reference value at step S14 (S14: NO), the DSP multiplies the operation amount α1 calculated in the subroutine by a predetermined reduction ratio "Adjustment" (S18) to thereby calculate an operation amount α4 represented in Equation (13). When the processing at step S17 or S18 is ended, the DSP stores the operation amount α3 or α4 being the multiplied value at step S17 or S18 in a data memory (not illustrated) (S19) and ends the processing in FIG. 3.

Noted that the operation amount α4 may forcedly be regarded as 0 at step S18.

Turning now to FIG. 4, when the subroutine in relation to the operation amount calculation is invoked, the DSP detects the magnitude of AC voltage (E/√2) by the AC voltage detecting unit 44 (S21) and further detects the magnitude of AC current (I/√2) by the AC current detecting unit 45 (S22). Then, the DSP applies the detected magnitude of the AC voltage to the right side of Equation (6) to calculate the magnitude of reactive current (2 πfCE/√2) shunted to the noise filter 3 (S23: corresponding to the first calculation unit) and applies the calculated magnitude of the reactive current and the magnitude of AC current to the right side of Equation (9) to calculate a target value θa for a phase delay of the AC current (S24: corresponding to the second calculation unit).

Then, the DSP applies the calculated target value θa for the phase delay to the right side of Equation (10) to calculate an operation amount α1 for delaying the phase of switching by the converter 5 (S25: corresponding to the third calculation unit for calculating an operation amount) and returns the invoked routine.

Noted that by the processing in FIG. 3, whether the magnitude of the DC power calculated by the product of the magnitude of the DC voltage and the magnitude of the AC current that are outputted from the converter 9 is smaller than the reference value for power is determined. However, based on the description in relation to Equation (11) above, whether the magnitude of the apparent power calculated by the product of the magnitude of the AC voltage (E/√2) and the magnitude of the AC current (I/√2) that are detected in the subroutine is smaller than the reference value for power may be determined at step S14. In this case, at step S15, the operation amount α1 calculated in the subroutine and the calculated magnitude of the DC power are multiplied. Similarly, based on the description in relation to Equation (11) above, whether or not the magnitude of the AC current (I/√2) detected in the subroutine is smaller than the reference value for current may be determined at step S14. In this case, at step S15, the operation amount α1 calculated in the subroutine and the detected magnitude of the DC current are multiplied, and at step S16, the multiplied value is divided by the reference value for current.

Furthermore, at step S22 in FIG. 4, the magnitude of the AC current (I/√2) is detected by the AC current detecting unit 45, but in place of the detected magnitude of the AC current, the magnitude of AC current obtained by dividing I calculated by Equation (5) by √2 may be used. In this case, the product of the output voltage and the output current of the converter 5 is essentially to be applied to the output power of the converter 5 that is to be substituted to the right side of Equation (5), but in Embodiment 1, the product of the output voltage from the converter 9 detected as voltage of the capacitor 3 and the output current of the converter 9 detected by the current sensor 11 is applied.

The following describes the effect of the invention in the bidirectional AC/DC conversion apparatus 1 according to Embodiment 1 of the present invention by using a simulation result.

Figure 5:
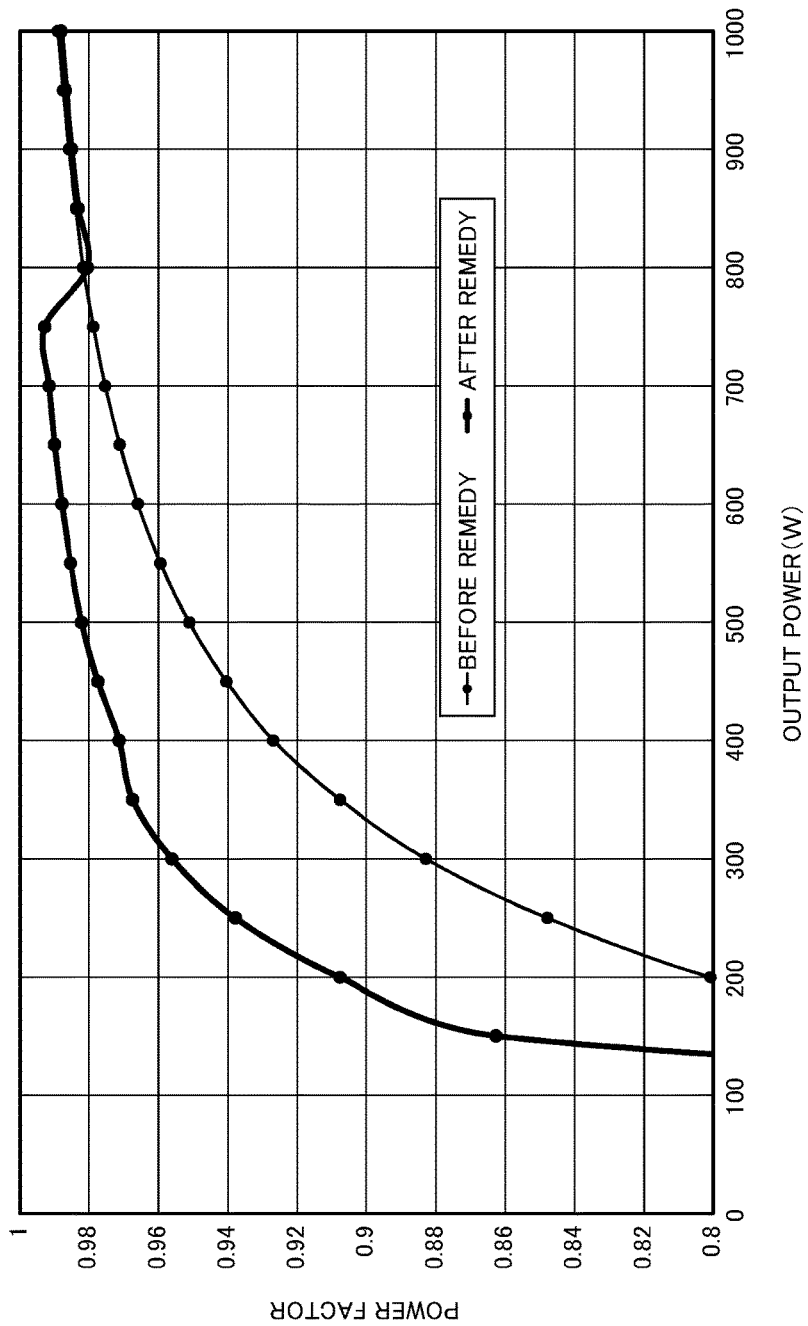
FIG. 5 is a chart illustrating variations of a power factor versus output power in the bidirectional AC/DC conversion apparatus according to Embodiment 1 of the present invention.
Figure 6:
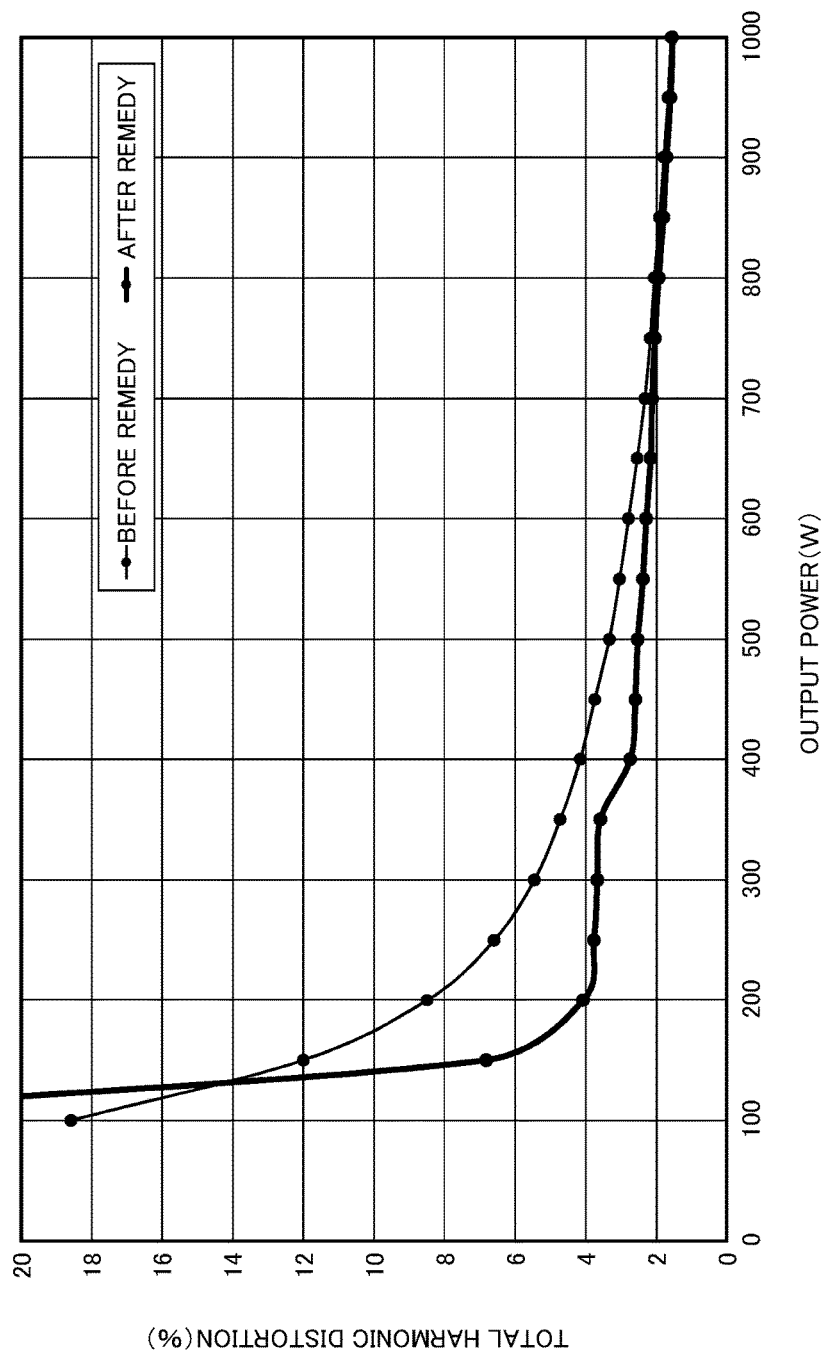
FIG. 6 is a chart illustrating variations of total harmonic distortion versus output power in the bidirectional AC/DC conversion apparatus according to Embodiment 1 of the present invention.

FIG. 5 is a chart illustrating variations of a power factor versus output power in the bidirectional AC/DC conversion apparatus 1 according to Embodiment 1 of the present invention while FIG. 6 is a chart illustrating variations of total harmonic distortion versus output power in the bidirectional AC/DC conversion apparatus 1 according to Embodiment 1 of the present invention. The vertical axes in FIG. 5 and FIG. 6 respectively represent a power factor and total harmonic distortion (%), and the horizontal axes in both Figures represent DC output power (W). In both cases in FIG. 5 and FIG. 6, the magnitude of the input AC voltage (effective value) is 240 V ac and the output voltage is 300 V dc. Furthermore, the characteristic before a remedy by adjustment is applied is represented by a thin solid line while the characteristic after a remedy by adjustment is applied is represented by a bold solid line.

In FIG. 5, the power factors at the output power of 200 W, 300 W, 400 W, 600 W and 800 W are respectively 0.800, 0.883, 0.927, 0.966 and 0.982 before a remedy is applied while being respectively 0.908, 0.956, 0.977, 0.988 and 0.980 after a remedy is applied. In the case where the output power is equal to or less than the reference value for power, there is an effect of the power factor correction being further achieved as the output power decreases.

In FIG. 6, the total harmonic distortion at the output power of 150 W, 250 W, 400 W, 600 W and 800 W is 12.0%, 6.58%, 4.15%, 2.79% and 2.05% before a remedy is applied while being respectively 6.81%, 3.77%, 2.74%, 2.28% and 1.93% after a remedy is applied. In the case where the output power is equal to or less than the reference value for power, there is an effect of the total harmonic distortion being further reduced as the output power roughly decreases.

According to Embodiment 1 as described above, the advanced-phase reactive current is shunted to the capacitor in the noise filter 3 interposed across the input side of the AC voltage. When the converter 5 converts AC voltage inputted via the noise filter 3 into DC voltage by switching by means of the IGBTs 52 and 54, the power factor of the AC power inputted to the noise filter 3 is corrected by the DSP of the control unit 10. The DSP calculates, by the first calculation unit, the magnitude of reactive current that flows through the capacitor with a phase advanced by π/2 from the AC voltage based on the magnitude of the AC voltage inputted to the converter 5 and the capacitance of the capacitor in the noise filter 3, calculates, by the second calculation unit, a target value θa for phase delay of the AC current based on the calculated magnitude of the reactive current and the magnitude of the AC current inputted to the converter 5 or the magnitude of the DC power outputted from the converter 5 in order to perform control such that the AC current becomes delayed-phase current that cancels out the above-described advanced-phase reactive current, and calculates, by the third calculation unit, an operation amount α1 for delaying the phase of turning on and off of the IGBTs 52 and 54 of the converter 5 based on the calculated target value θa.

Thus, depending on the magnitude of the AC voltage and the magnitude of the AC current that are inputted to the converter 5 or the magnitude of the input AC voltage and the magnitude of the output DC power as well as the capacitance of the capacitor, the operation amount α1 for delaying the phase of turning on and off of the IGBTs 52 and 54 by the converter 5 is calculated in order to cancel out the advanced-phase reactive current shunted to the capacitor, and the amount of phase delay of the AC current inputted to the converter 5 is controlled in accordance with the calculated operation amount α1.

Accordingly, it is possible to correct the power factor of the total AC power including the reactive power due to the current shunted to the capacitor in the circuit interposed across the input side of the AC power.

Furthermore, according to Embodiment 1, as the magnitude of the AC current inputted to the converter 5 or the magnitude of the DC power outputted from the converter 5 are small as compared to the reference value (BaseValue), the operation amount α1 for delaying the phase of turning on and off is reduced to α2.

Accordingly, in the case where the current inputted to the converter 5 or the power outputted from the converter 5 is relatively small as compared to the advanced-phase reactive current shunted to the above-described capacitor, it is possible to avoid the situation where the delayed-phase AC current corresponding to the operation amount α1 becomes current in an opposite direction on calculation.

In addition, according to Embodiment 1, the operation amount α3 (or α4) obtained by further reducing the calculated operation amount α2 (or α1) at a predetermined ratio (Adjustment) is regarded as a calculation result.

Accordingly, it is possible to reduce the total harmonic distortion at some penalty in the power factor correction.

Embodiment 2

In Embodiment 1, the operation amount α3 or α4 is respectively calculated by Equation (12) or (13), and the calculated magnitude of the operation amount does not matter while in Embodiment 2, an upper limit is set to the calculated magnitude of the operation amount. Since the configuration of a bidirectional AC/DC conversion apparatus 1 and a noise filter 3 in Embodiment 2 is similar to that in Embodiment 1, the following does not describe the configuration and describes an operation of the control unit 10 by using a flowchart.

Figure 7:
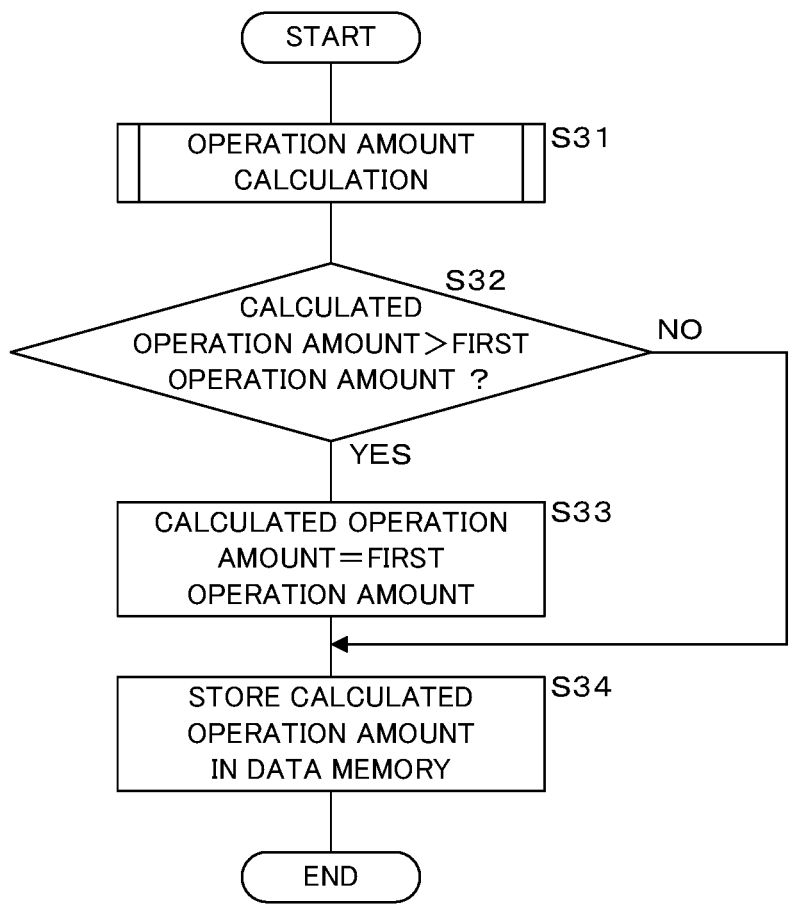
FIG. 7 is a flowchart of a processing procedure by a DSP for calculating an operation amount for delaying switching in a power factor correcting device according to Embodiment 2 of the present invention.

FIG. 7 is a flowchart of a processing procedure by a DSP for calculating an operation amount for delaying the switching in the power factor correcting device according to Embodiment 2 of the present invention. The processing in FIG. 7 is activated every cycle of the AC voltage of the public electricity 2, for example.

When the processing in FIG. 7 is activated, the DSP invokes a subroutine in relation to operation amount calculation in order to calculate an operation amount α1 represented by the above-described Equation (10) (S31). When the DSP returns the subroutine, the DSP determines whether or not the operation amount α1 calculated by the subroutine is larger than a predetermined first operation amount (S32). If it is larger than the predetermined first operation amount (S32: YES), the first operation amount is regarded as a calculated operation amount (S33: corresponding to the third calculation unit). The first operation amount is an upper limit of the operation amount.

If the operation amount α1 calculated by the subroutine is not larger than the predetermined first operation amount (S32: NO), or if the operation at step S33 is ended, the DSP stores the operation amount calculated at step S31 or S33 (α1 or the first operation amount here) in a data memory (not illustrated) (S34) and ends the processing in FIG. 7.

In Embodiment 2, whether or not the operation amount α1 is larger than the first operation amount is determined, but whether or not any one of the operation amounts α2, α3 and α4 calculated at steps S15, S17 and S18 in FIG. 3 is larger than the first operation amount may be determined.

According to Embodiment 2 as described above, if the calculated operation amount α1, α2, α3 or α4 is larger than the first operation amount, the first operation amount is regarded as a calculation result.

Accordingly, even when the current inputted to the converter 5 or the power outputted from the converter 5 is reduced, which increases the operation amount, the upper limit of the operation amount is restricted to the first operation amount, and thus it is possible to avoid the situation where the delayed-phase AC current corresponding to the operation amount becomes current in an opposite direction on calculation.

Embodiment 3

In Embodiment 1, the operation amount α2, α3 or α4 is calculated while in Embodiment 3, an operation amount is regarded as a constant value in the case where the magnitude of the AC current inputted to the power factor correcting device or the DC power outputted from the power factor correcting device is smaller than a predetermined magnitude. Since the configuration of a bidirectional AC/DC conversion apparatus 1 and a noise filter 3 in Embodiment 3 is similar to that in Embodiment 1, the following does not describe the configuration and describes an operation of the control unit 10 by using a flowchart.

Figure 8:
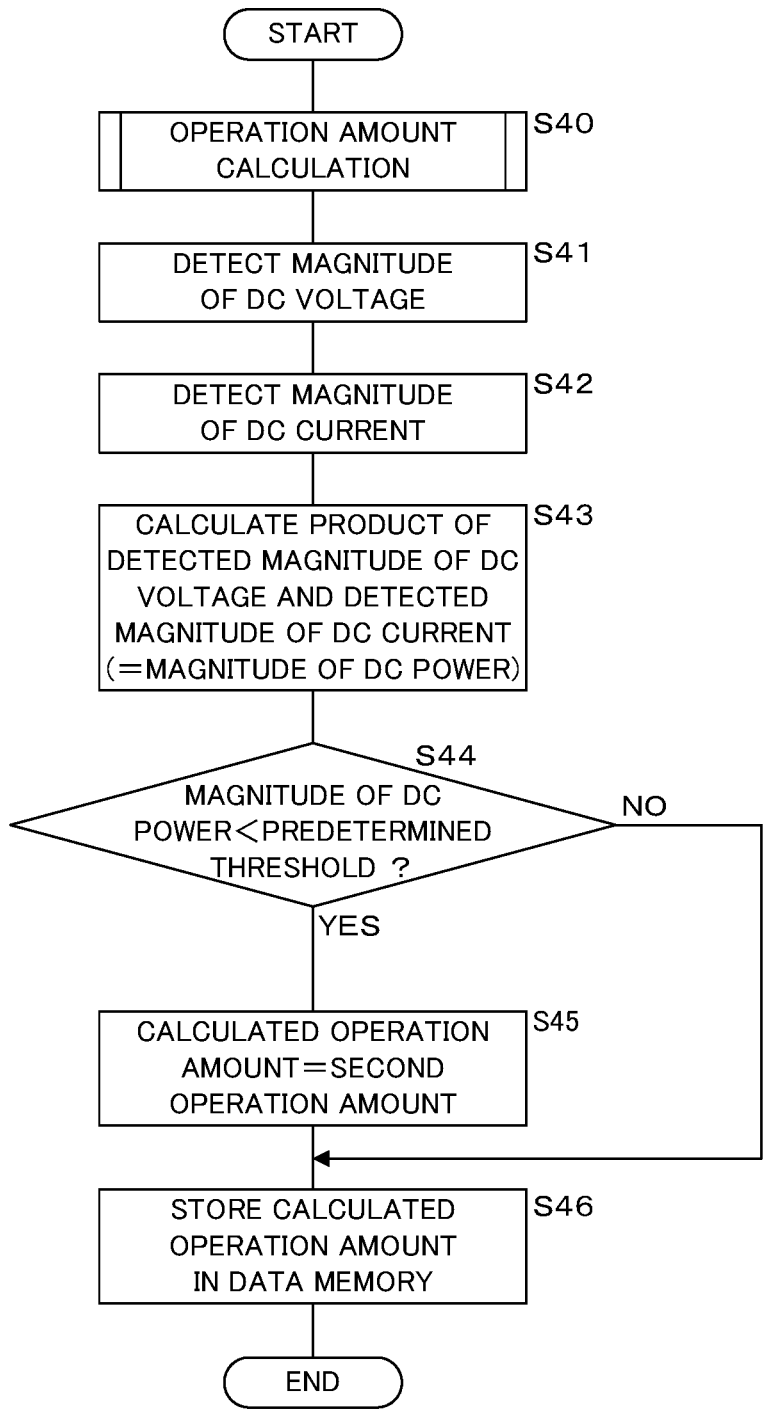
FIG. 8 is a flowchart of a processing procedure by a DSP for calculating an operation amount for delaying switching in a power factor correcting device according to Embodiment 3 of the present invention.

FIG. 8 is a flowchart of a processing procedure by a DSP for calculating an operation amount for delaying the switching in the power factor correcting device according to Embodiment 3 of the present invention. The processing in FIG. 8 is activated every cycle of the AC voltage of the public electricity 2, for example. Noted that in the flowchart in FIG. 8, the DC power outputted in a second direction from the converter 9 is detected in place of the DC power outputted from the power factor correcting device.

Since the processing from steps S40 to S43 in FIG. 8 is similar to the processing from steps S10 to S13 depicted in FIG. 3 in Embodiment 1, the detail of these steps will not be described.

Parts corresponding to those in Embodiment 1 are denoted by similar reference numerals and will not be described.

When the processing at step S43 is ended in FIG. 8, the DSP determines whether or not the calculated magnitude of the DC power, that is, the magnitude of the DC power outputted from the converter 9 is smaller than a predetermined threshold (S44), and if it is small (S44: YES), a predetermined second operation amount is regarded as a calculated operation amount (S45: corresponding to the third calculation unit).

If the calculated magnitude of the DC power is not smaller than the predetermined threshold (S44: NO), or if the processing at step S45 is ended, the DSP stores in a data memory (not illustrated) (S46) the operation amount α1 or the second operation amount calculated in the subroutine at step S40 and ends the processing in FIG. 8.

Noted that in the processing in FIG. 8, whether or not the magnitude of the DC power calculated by the product of the DC voltage and the DC current that are outputted from the converter 9 is smaller than the predetermined threshold is determined. This is not limited to the DC power. For example, in the case where the magnitude of the DC power outputted from the converter 9 becomes small, when the AC voltage of the public electricity 2 is made constant, the AC current inputted to the converter 5 is also made small. Thus, it may be possible to determine whether or not the magnitude of the AC current detected by the AC current detecting unit 45 is smaller than the predetermined threshold at S44.

According to Embodiment 3 as described above, when the magnitude of the AC current inputted to the converter 5 or the magnitude of the DC power outputted from the converter 5 is smaller than the predetermined threshold, the predetermined second operation amount is regarded as a calculation result by the third calculation unit.

Accordingly, when the magnitude of the current inputted to the converter 5 or the magnitude of the power outputted from the converter 5 is reduced to become smaller than the predetermined threshold, by the operation amount being fixed to the second operation amount, it is possible to provide a certain extent of the effect of the power factor correction and to avoid a situation where the delayed-phase AC current corresponding to the operation amount becomes current to be outputted from the input side of the converter 5.

Embodiment 4

In Embodiment 1, AC voltage is converted into DC voltage in the bidirectional AC/DC conversion apparatus 1 while in Embodiment 4, DC voltage is converted into AC voltage in a bidirectional AC/DC conversion apparatus 1. The configuration of the bidirectional AC/DC conversion apparatus 1 and a noise filter 3 in Embodiment 4 is similar to that in Embodiment 1.

Parts corresponding to those in Embodiment 1 are denoted by similar reference numerals and will not be described.

In the case where DC voltage is converted into AC voltage in the bidirectional AC/DC conversion apparatus 1, the AC voltage Vac to be supplied to the public electricity 2 is represented by the above-described Equation (1) while the advanced-phase reactive current iC shunted to the noise filter 3 from the converter 5 functioning as an inverter is represented by the following Equation (6). Thus, it is reasonable that the AC current to be outputted from the converter 5 may include the advanced-phase reactive current enough to cancel out the reactive current iC represented by Equation (6). The effective value of the corrective amount of the reactive current (hereinafter, referred to as the magnitude of corrective current) is assumed to be β1 and β2, and in Embodiment 4, β1 and β2 are respectively calculated by the following Equations (14) and (15). Here, the following Equation (1) and Equation (6) are described again.

$$Vac = E \sin(2\pi ft) \quad (1)$$

$$iC = (2\pi fCE)\cos(2\pi ft) \quad (6)$$

$$\beta 1 = (2\pi fCE/\sqrt{2}) \times \text{Adjustment}/2 \quad (14)$$

$$\beta 2 = \beta 1 \times (\text{Target}/\text{BaseValue}) \quad (15)$$

where
Target: magnitude of input power to the converter 5
BaseValue: reference value for power
Adjustment: reduction coefficient in the range of 0.2-0.5 (0.4 is taken here)

The following describes an operation by the control unit 10 by using a flowchart depicting thereof.

Figure 9:
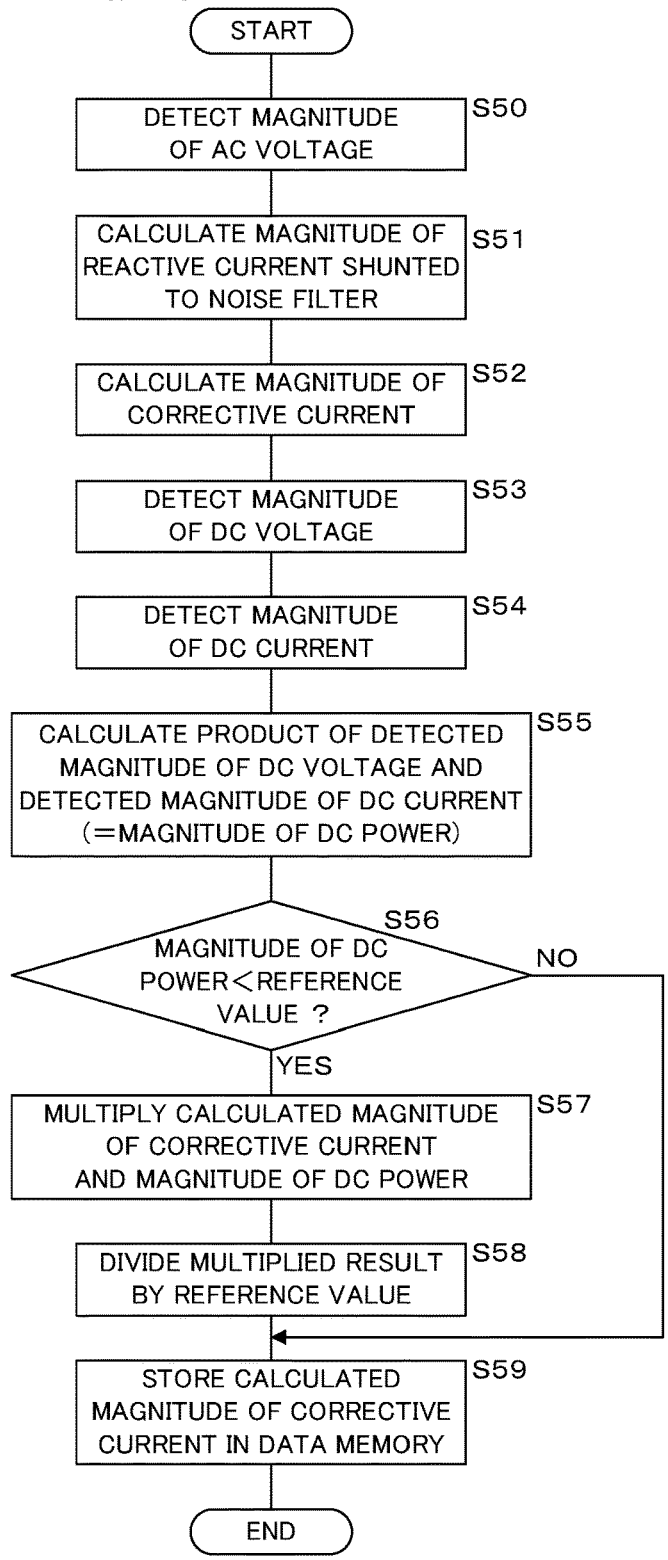
FIG. 9 is a flowchart of a processing procedure by a DSP for calculating the magnitude of correction current in a bidirectional AC/DC conversion apparatus according to Embodiment 4 of the present invention.

FIG. 9 is a flowchart of a processing procedure by a DSP for calculating the magnitude of corrective current in the bidirectional AC/DC conversion apparatus 1 according to Embodiment 4 of the present invention. The processing in FIG. 9 is activated every cycle of the AC voltage from the public electricity 2, for example.

When the processing in FIG. 9 is activated, the DSP detects the magnitude of the AC voltage (E/√2) by the AC voltage detecting unit 44 (S50) and applies the detected magnitude of the AC voltage to the right side of Equation (6) to calculate the magnitude of reactive current (2 πfCE/√2) shunted to the noise filter 3 (S51). The DSP then applies the calculated magnitude of the reactive current to Equation (14) to calculate the magnitude of corrective current β1 (S52).

Furthermore, the DSP detects the magnitude of the DC voltage inputted to the converter 9 from the DC input/output terminals T83 and T84 (S53), detects the magnitude of the DC current inputted to the converter 9 by the current sensor 11 (S54) and then calculates the product of the detected magnitude of the DC voltage and the detected magnitude of the DC current (S55). The value obtained by the product is the magnitude of the DC power called "Target" in Equation (15). Here, the magnitude of the input power to the converter 9 is regarded as the input power to the converter 5. However, the input power to the converter 5 may be reduced in view of the conversion efficiency of the converter 9.

Successively, DSP determines whether or not the calculated magnitude of the DC power is smaller than a reference value for power (S56). If it is small (S56: YES), the magnitude of the corrective current β1 calculated at step S52 and the calculated magnitude of the DC power are multiplied (S57). Furthermore, the DSP divides the multiplied value by the reference value (S58) to calculate the magnitude of corrective current β2 represented by Equation (15).

If the calculated magnitude of the DC power is not smaller than the reference value at step S56 (S56: NO), or if the processing at step S58 is ended, the DSP stores the magnitude of the corrective current β1 or β2 respectively calculated at S52 or S58 in a data memory (not illustrated) (S59) and ends the processing in FIG. 9.

The following describes the effect of the invention in the bidirectional AC/DC conversion apparatus 1 according to Embodiment 4 of the present invention by using a simulation result.

Figure 10:
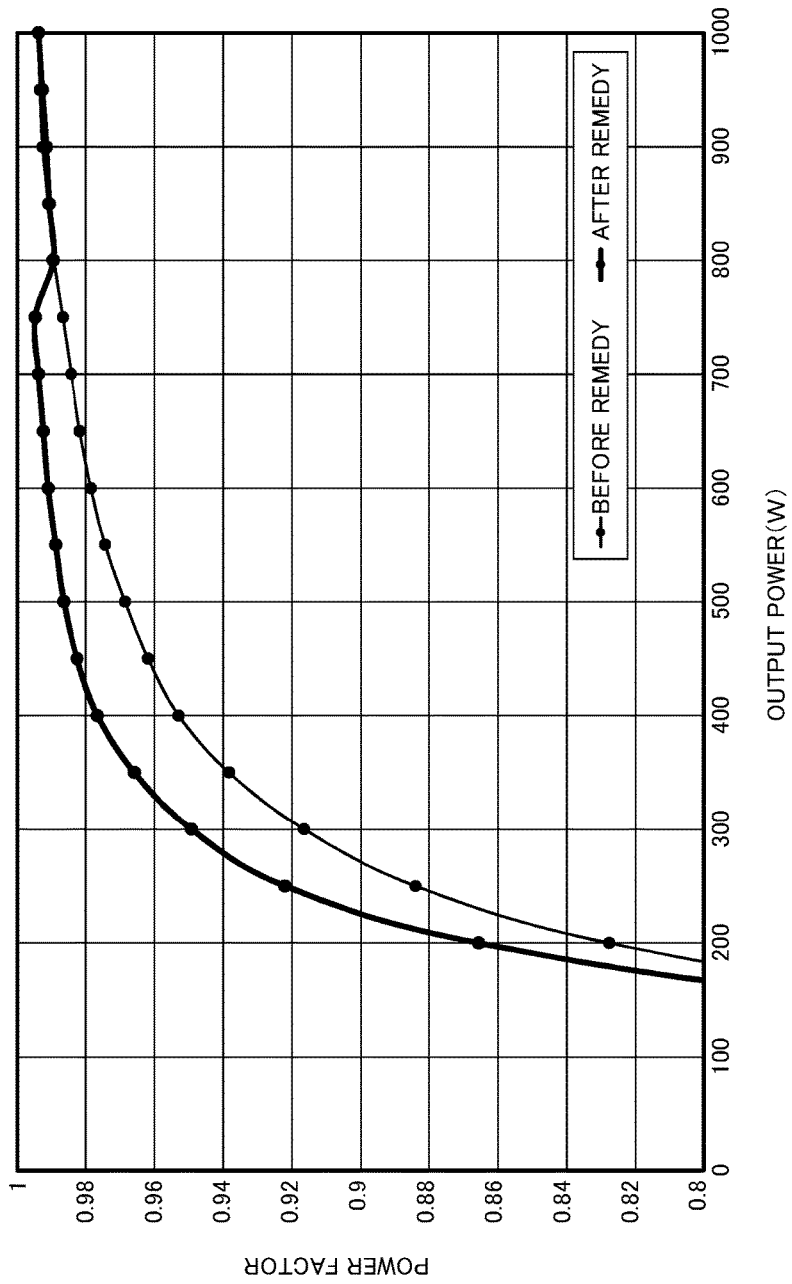
FIG. 10 is a chart illustrating variations of a power factor versus output power in the bidirectional AC/DC conversion apparatus according to Embodiment 4 of the present invention.
Figure 11:
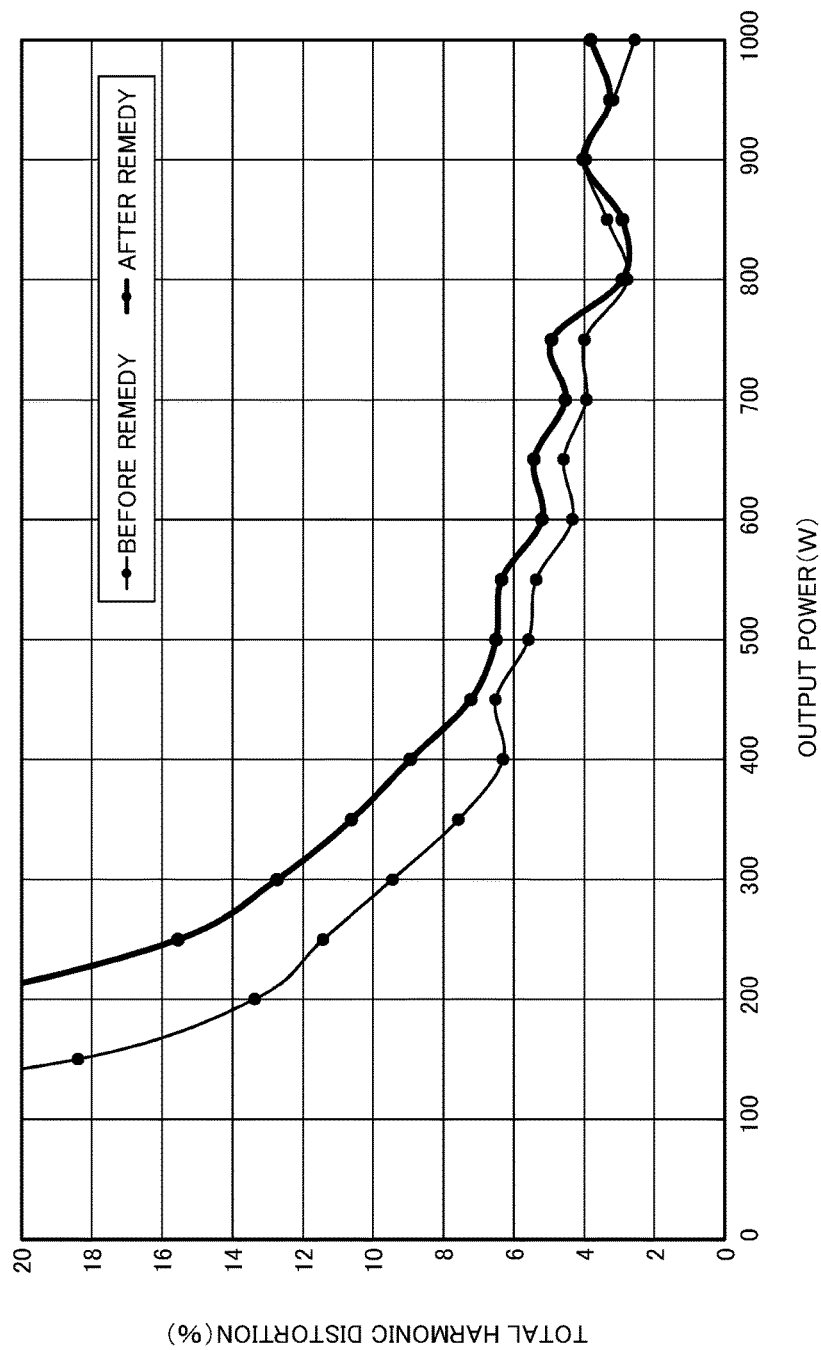
FIG. 11 is a chart illustrating variations of total harmonic distortion versus output power in the bidirectional AC/DC conversion apparatus according to Embodiment 4 of the present invention.

FIG. 10 is a chart illustrating variations of a power factor versus output power in the bidirectional AC/DC conversion apparatus 1 according to Embodiment 4 of the present invention while FIG. 11 is a chart illustrating variations of total harmonic distortion versus output power in the bidirectional AC/DC conversion apparatus 1 according to Embodiment 4 of the present invention. The vertical axes in FIG. 10 and FIG. 11 respectively represent a power factor and total harmonic distortion (%), and the horizontal axes in both Figures represent AC output power (W). In both cases in FIG. 10 and FIG. 11, the magnitude of the input voltage is 300 V dc and the magnitude of the output voltage (effective value) is 240 V ac. Furthermore, the characteristic before a remedy by adjustment is applied is represented by a thin solid line while the characteristic after a remedy by adjustment is applied is represented by a bold solid line.

In FIG. 10, the power factors at the output power of 200 W, 300 W, 400 W, 600 W and 800 W are respectively 0.828, 0.917, 0.953, 0.978 and 0.989 before a remedy is applied while being respectively 0.866, 0.949, 0.977, 0.991 and 0.990 after a remedy is applied. In the case where the output power is equal to or less than the reference value for power, there is an effect of the power factor correction being further achieved as the output power decreases.

In FIG. 11, the total harmonic distortion at the output power of 250 W, 350 W, 500 W, and 700 W is respectively 11.4%, 7.57%, 5.58%, and 3.94% before a remedy is applied while being respectively 15.5%, 10.6%, 6.50%, and 4.53% after a remedy is applied. In the case where the output power is equal to or less than the reference value for power, the total harmonic distortion is greatly reduced.

According to Embodiment 4 and the above-described Embodiment 1, the power factor correcting device performs bidirectional conversions between AC and DC by using the full bridge circuit 50, and the converter 9 performs bidirectional conversions into DC voltage toward the battery B1 and into DC voltage toward the power factor correcting device.

Accordingly, the power factor correcting device that corrects the power factor of the total AC power including the reactive power by the current shunted to the capacitor in the circuit interposed across the input side of the AC power can be applied to the bidirectional AC/DC conversion apparatus 1.

Embodiment 5

In Embodiments 1 and 4, the converter 5 of the power factor correcting device has the full bridge circuit 50 and enables bidirectional conversions between AC voltage and DC voltage while in Embodiment 5, a converter of the power factor correcting device converts pulsating voltage into DC voltage.

Figure 12:
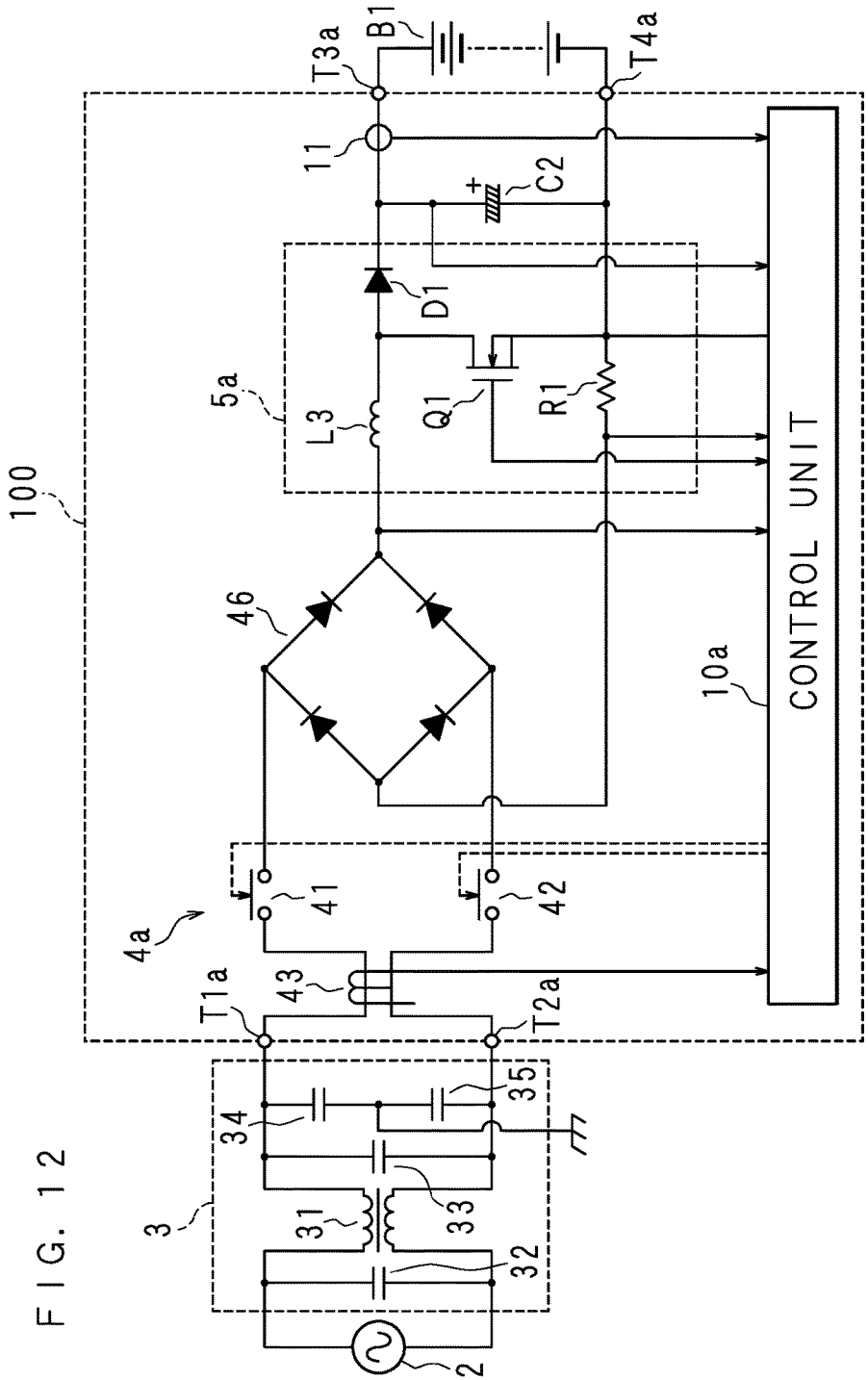
FIG. 12 is a circuit diagram illustrating an example of a configuration of a power factor correcting device according to Embodiment 5 of the present invention.

FIG. 12 is a circuit diagram illustrating an example of a configuration of a power factor correcting device according to Embodiment 5 of the present invention. In the drawing, the reference numeral 100 denotes a power factor correcting device including AC input terminals T1a and T2a to which AC power from the public electricity 2 is inputted via the noise filter 3 and DC output terminals T3a and T4a respectively connected to the plus terminal and the minus terminal of the battery B1.

The power factor correcting device 100 includes an input unit 4a that inputs AC power from the AC input/output terminals T1a and T2a, a full-wave rectifying circuit 46 being a diode bridge that full-wave rectifies AC voltage inputted via the input unit 4a, a step-up converter 5a that converts pulsating voltage obtained by full-wave rectifying the AC voltage by the full-wave rectifying circuit 46 into DC voltage by switching, and a control unit 10a that controls the voltage conversion by the converter 5a. The pulsating voltage outputted from the full-wave rectifying circuit 46 is detected by a voltage sensor (corresponding to a voltage detecting unit) integrated in the control unit 10a and captured by the control unit 10a as a reference voltage of the pulsating voltage.

A capacitor C2 for smoothing DC voltage is connected across the output side of the converter 5a. The DC voltage of the capacitor C2, that is, the output voltage from the converter 5a is detected by the voltage sensor integrated in the control unit 10a. The DC current outputted from the DC output terminals T3a and T4a by the converter 5a is detected by the current sensor 11 having a detection terminal connected to the control unit 10a. The control unit 10a is a DSP, for example. The DC power outputted from the converter 5a is calculated by the DSP as the product of DC voltage and DC current that are detected (corresponding to a detection unit for detecting the magnitude of the DC power) but may directly be detected by a detection circuit.

The converter 5a includes an inductor L3 having one end connected to the output terminal on the plus side of the full-wave rectifying circuit 46, an n-channel MOSFET (hereinafter, referred to as a transistor) Q1 having a drain terminal connected to the other end of the inductor L3, and a resistor R1 connected between a source terminal of the transistor Q1 and the output terminal on the minus side of the full-wave rectifying circuit 46. The other end of the inductor L3 is connected to an anode terminal of a diode D1 and a cathode terminal of the diode D1 is an output terminal of the converter 5a.

A gate terminal of the transistor Q1 is connected to the control unit 10a and receives a pulse width modulation (PWM) signal from a driving unit (not illustrated). Both ends of the resistor R1 are connected to the control unit 10a in order to detect current flowing in the inductor L3, that is, pulsating current flowing from the full-wave rectifying circuit 46 into the converter 5a.

The noise filter 3 has a configuration the same as that in Embodiment 1. The input unit 4a is obtained by deleting the AC voltage detecting unit 44 and the AC current detecting unit 45 from the input/output unit 4 in Embodiment 1. Other parts corresponding to those in Embodiment 1 are denoted by similar reference numerals and will not be described here.

The control unit 10a compares the pulsating voltage obtained by multiplying by a multiplier the captured pulsating voltage and the output voltage from the converter 5a and the detected voltage by the resistor R1 and controls the timing of turning on and off of the PWM signals applied to the gate terminal of the transistor Q1 based on the result of the comparison. The drain voltage of the transistor Q1 is smoothed by the diode D1 and the capacitor C2, and is outputted as DC voltage from the DC output terminals T3a and T4a.

In the power factor correcting device 100, the pulsating current detected by the resistor R1 is controlled so as to change in phase with the pulsating voltage inputted from the full-wave rectifying circuit 46 to the converter 5a. The pulsating current detected here does not include the current shunted to the capacitors 32, 33, 34 and 35 of the noise filter 3. Thus, similarly to Embodiment 1, as the magnitude of the pulsating current inputted to the converter 5 decreases to be close to the magnitude of the reactive current, the power factor of the total AC power supplied from the public electricity 2 through the noise filter 3 is reduced.

Here, assuming that AC voltage and AC current are detected by the input unit 4a, Equations the same as Equations (1) to (13) in Embodiment 1 are established. Then, E and I in Equation (9) are respectively detected as pulsating voltage inputted to the converter 5a and a peak value of the pulsating current (that is, the magnitude of the pulsating voltage and the magnitude of the pulsating current$\times\sqrt{2}$). In Embodiment 1, an operation amount is adjusted every half cycle of AC voltage while in Embodiment 5, an operation amount may be adjusted at a cycle of the pulsating voltage corresponding to the above-described half cycle. Thus, the calculation processing of the operation amount $\alpha 1$, $\alpha 2$ $\alpha 3$ and $\alpha 4$ by the DSP will not be described here.

According to Embodiment 5 as described above, the advanced-phase reactive current is shunted to the capacitor in the noise filter 3 interposed across the input side of the AC voltage. When the converter 5a converts pulsating voltage obtained by full-wave rectifying AC voltage inputted via the noise filter 3 into DC voltage by switching by means of the transistor Q1, the power factor of the AC power inputted to the noise filter 3 is corrected by the DSP of the control unit 10a. The DSP calculates, by the first calculation unit, a magnitude of reactive current flowing in the capacitor with a phase advanced by π/2 from the AC voltage based on the magnitude of the pulsating voltage inputted to the converter 5a and the capacitance of the capacitor in the noise filter 3, calculates, by the second calculation unit, a target value θa for phase delay of the pulsating current based on the calculated magnitude of the reactive current and the magnitude of the pulsating current inputted to the converter 5a or the magnitude of the DC power outputted from the converter 5a in order to perform control such that the pulsating current becomes delayed-phase current that cancels out the above-described advanced-phase reactive current, and calculates, by the third calculation unit, an operation amount for delaying the phase of turning on or off of the transistor Q1 of the converter 5a based on the calculated target value θa.

Thus, depending on the magnitude of the pulsating voltage and the magnitude of the pulsating current that are inputted to the converter 5a or the magnitude of the input pulsating voltage and the magnitude of the output DC power as well as the capacitance of the capacitor, the operation amount α1 for delaying the phase of turning on and off of the transistor Q1 of the converter 5a is calculated in order to cancel out the advanced-phase reactive current shunted to the capacitor, and the amount of phase delay of the pulsating current inputted to the converter 5a is controlled in accordance with the calculated operation amount α1.

Accordingly, it is possible to correct the power factor of the total AC power including the reactive power due to the current shunted to the capacitor in the circuit interposed across the input side of the AC power.

It is to be noted that, as used herein and in the appended claims, the singular forms "a", "an", and "the" include plural referents unless the context clearly dictates otherwise.

The embodiments disclosed this time are examples in all respects, and should be considered to be not restrictive. The scope of the present invention is not limited to the above-described meaning but is indicated by the claims, and it is intended that all modifications within the meaning and scope equivalent to the claims are included. In addition, the technical features described in the respective embodiments can be combined with each other.

The invention claimed is:

1. A power factor correcting device, comprising:
a converter that converts, by switching, AC voltage into DC voltage, the AC voltage being inputted via a circuit with a capacitor through which reactive current flows;
a voltage detection unit that detects a magnitude of AC voltage inputted to the converter;
a detection unit that detects a magnitude of AC current inputted to the converter or a magnitude of DC power outputted from the converter; and
a control unit that corrects a power factor of AC power inputted to the circuit by controlling switching by the converter,
wherein the control unit includes:
a first calculation unit that calculates a magnitude of reactive current flowing in the circuit with a phase advanced by π/2 from the AC voltage based on the magnitude detected by the voltage detection unit and capacitance of the capacitor,
a second calculation unit that calculates a target value for a phase delay of the AC current with respect to the AC voltage based on the magnitude calculated by the first calculation unit and the magnitude detected by the detection unit, and
a third calculation unit that calculates an operation amount for delaying a phase of the switching based on the target value calculated by the second calculation unit, and
wherein the third calculation unit regards a first operation amount as the calculated operation amount in a case where the calculated operation amount is larger than the first operation amount.

2. The power factor correcting device according to claim 1,
wherein the third calculation unit calculates an operation amount reduced as the magnitude detected by the detection unit becomes smaller than a reference value.

3. The power factor correcting device according to claim 1,
wherein the third calculation unit calculates an operation amount reduced at a predetermined ratio.

4. A bidirectional AC/DC conversion apparatus, comprising:
the power factor correcting device according to claim 1; and
a DC/DC converter that bidirectionally converts DC voltage, wherein
the power factor correcting device has a full bridge circuit that is included in the converter and bidirectionally performs conversion between AC voltage and DC voltage.

5. A power factor correcting device, comprising:
a converter that converts, by switching, AC voltage into DC voltage, the AC voltage being inputted via a circuit with a capacitor through which reactive current flows;
a voltage detection unit that detects a magnitude of AC voltage inputted to the converter;
a detection unit that detects a magnitude of AC current inputted to the converter or a magnitude of DC power outputted from the converter; and
a control unit that corrects a power factor of AC power inputted to the circuit by controlling switching by the converter,
wherein the control unit includes:
a first calculation unit that calculates a magnitude of reactive current flowing in the circuit with a phase advanced by π/2 AC voltage based on the magnitude detected by the voltage detection unit and capacitance of the capacitor,
a second calculation unit that calculates a target value for a phase delay of the AC current with respect to the AC voltage based on the magnitude calculated by the first calculation unit and the magnitude detected by the detection unit, and
a third calculation unit that calculates an operation amount for delaying a phase of the switching based on the target value calculated by the second calculation unit, and
wherein the third calculation unit regards a second operation amount as the calculated operation amount in a case where the magnitude detected by the detection unit is smaller than a predetermined threshold.

6. The power factor correcting device according to claim 5, wherein the third calculation unit calculates an operation amount reduced as the magnitude detected by the detection unit becomes smaller than a reference value.

7. The power factor correcting device according to claim 5,
wherein the third calculation unit calculates an operation amount reduced at a predetermined ratio.

8. A bidirectional AC/DC conversion apparatus, comprising:
the power factor correcting device according to claim 5; and
a DC/DC converter that bidirectionally converts DC voltage, wherein
the power factor correcting device has a full bridge circuit that is included in the converter and bidirectionally performs conversion between AC voltage and DC voltage.

9. A power factor correcting device, comprising:
a converter that converts, by switching, pulsating voltage obtained by full-wave rectifying AC voltage into DC voltage, the AC voltage being inputted via a circuit with a capacitor through which reactive current flows;
a voltage detection unit that detects a magnitude of pulsating voltage inputted to the converter;
a detection unit that detects a magnitude of pulsating current inputted to the converter or a magnitude of DC power outputted from the converter; and
a control unit that corrects a power factor of AC power inputted to the circuit by controlling switching by the converter,
wherein the control unit includes:
a first calculation unit that calculates a magnitude of reactive current flowing in the circuit with a phase advanced by $\pi/2$ from the AC voltage based on the magnitude detected by the voltage detection unit and capacitance of the capacitor;
a second calculation unit that calculates a target value for a phase delay of the pulsating current with respect to the pulsating voltage based on the magnitude calculated by the first calculation unit and the magnitude detected by the detection unit; and
a third calculation unit that calculates an operation amount for delaying a phase of the switching based on the target value calculated by the second calculation unit, and
wherein the third calculation unit regards a first operation amount as the calculated operation amount in a case where the calculated operation amount is larger than the first operation amount.

10. The power factor correcting device according to claim 9,
wherein the third calculation unit calculates an operation amount reduced as the magnitude detected by the detection unit becomes smaller than a reference value.

11. The power factor correcting device according to claim 9,
wherein the third calculation unit calculates an operation amount reduced at a predetermined ratio.

12. A bidirectional AC/DC conversion apparatus, comprising:
the power factor correcting device according to claim 9; and
a DC/DC converter that bidirectionally converts DC voltage, wherein
the power factor correcting device has a full bridge circuit that is included in the converter and bidirectionally performs conversion between AC voltage and DC voltage.

13. A power factor correcting device, comprising:
a converter that converts, by switching, pulsating voltage obtained by full-wave rectifying AC voltage into DC voltage, the AC voltage being inputted via a circuit with a capacitor through which reactive current flows;
a voltage detection unit that detects a magnitude of pulsating voltage inputted to the converter;
a detection unit that detects a magnitude of pulsating current inputted to the converter or a magnitude of DC power outputted from the converter; and
a control unit that corrects a power factor of AC power inputted to the circuit by controlling switching by the converter,
wherein the control unit includes:
a first calculation unit that calculates a magnitude of reactive current flowing in the circuit with a phase advanced by $\pi/2$ from the AC voltage based on the magnitude detected by the voltage detection unit and capacitance of the capacitor;
a second calculation unit that calculates a target value for a phase delay of the pulsating current with respect to the pulsating voltage based on the magnitude calculated by the first calculation unit and the magnitude detected by the detection unit; and
a third calculation unit that calculates an operation amount for delaying a phase of the switching based on the target value calculated by the second calculation unit, and
wherein the third calculation unit regards a second operation amount as the calculated operation amount in a case where the magnitude detected by the detection unit is smaller than a predetermined threshold.

14. The power factor correcting device according to claim 13,
wherein the third calculation unit calculates an operation amount reduced as the magnitude detected by the detection unit becomes smaller than a reference value.

15. The power factor correcting device according to claim 13,
wherein the third calculation unit calculates an operation amount reduced at a predetermined ratio.

16. A bidirectional AC/DC conversion apparatus, comprising:
the power factor correcting device according to claim 13; and
a DC/DC converter that bidirectionally converts DC voltage, wherein
the power factor correcting device has a full bridge circuit that is included in the converter and bidirectionally performs conversion between AC voltage and DC voltage.

17. A non-transitory computer readable recording medium storing a computer program for causing a computer to control a power factor correcting device including a converter that converts, by switching, AC voltage into DC voltage, the AC voltage being inputted via a circuit with a capacitor through which reactive current flows, a voltage detection unit that detects a magnitude of AC voltage inputted to the converter, a detection unit that detects a magnitude of AC current inputted to the converter or a magnitude of DC power outputted from the converter, and a control unit that corrects a power factor of AC power inputted to the circuit by controlling switching by the converter, the computer program causing the computer to perform:

calculating a magnitude of reactive current flowing in the circuit with a phase advanced by $\pi/2$ from the AC voltage based on the magnitude detected by the voltage detection unit and capacitance of the capacitor;

calculating a target value for a phase delay of the AC current with respect to the AC voltage based on the magnitude calculated by the first calculation unit and the magnitude detected by the detection unit;

calculating an operation amount for delaying a phase of the switching based on the target value calculated by the second calculation unit; and regarding a first operation amount as the calculated operation amount in a case where the calculated operation amount is larger than the first operation amount.

18. A non-transitory computer readable recording medium storing a computer program for causing a computer to control a power factor correcting device including a converter that converts, by switching, pulsating voltage obtained by full-wave rectifying AC voltage into DC voltage, the AC voltage being inputted via a circuit with a capacitor through which reactive current flows, a voltage detection unit that detects a magnitude of pulsating voltage inputted to the converter, a detection unit that detects a magnitude of pulsating current inputted to the converter or a magnitude of DC power outputted from the converter, and a control unit that corrects a power factor of AC power inputted to the circuit by controlling switching by the converter, the computer program causing the computer to perform:

calculating a magnitude of reactive current flowing in the circuit with a phase advanced by $\pi/2$ from the AC voltage based on the magnitude detected by the voltage detection unit and capacitance of the capacitor;

calculating a target value for a phase delay of the pulsating current with respect to the pulsating voltage based on the magnitude calculated by the first calculation unit and the magnitude detected by the detection unit;

calculating an operation amount for delaying a phase of the switching based on the target value calculated by the second calculation unit; and regarding a first operation amount as the calculated operation amount in a case where the calculated operation amount is larger than the first operation amount.

19. A non-transitory computer readable recording medium storing a computer program for causing a computer to control a power factor correcting device including a converter that converts, by switching, AC voltage into DC voltage, the AC voltage being inputted via a circuit with a capacitor through which reactive current flows, a voltage detection unit that detects a magnitude of AC voltage inputted to the converter, a detection unit that detects a magnitude of AC current inputted to the converter or a magnitude of DC power outputted from the converter, and a control unit that corrects a power factor of AC power inputted to the circuit by controlling switching by the converter, the computer program causing the computer to perform:

calculating a magnitude of reactive current flowing in the circuit with a phase advanced by the $\pi/2$ from the AC voltage based on the magnitude detected by the voltage detection unit and capacitance of the capacitor;

calculating a target value for a phase delay of the AC current with respect to the AC voltage based on the magnitude calculated by the first calculation unit and the magnitude detected by the detection unit;

calculating an operation amount for delaying a phase of the switching based on the target value calculated by the second calculation unit; and regarding a second operation amount as the calculated operation amount in a case where the magnitude detected by the detection unit is smaller than a predetermined threshold.

20. A non-transitory computer readable recording medium storing a computer program for causing a computer to control a power factor correcting device including a converter that converts, by switching, pulsating voltage obtained by full-wave rectifying AC voltage into DC voltage, the AC voltage being inputted via a circuit with a capacitor through which reactive current flows, a voltage detection unit that detects a magnitude of pulsating voltage inputted to the converter, a detection unit that detects a magnitude of pulsating current inputted to the converter or a magnitude of DC power outputted from the converter, and a control unit that corrects a power factor of AC power inputted to the circuit by controlling switching by the converter, the computer program causing the computer to perform:

calculating a magnitude of reactive current flowing in the circuit with a phase advanced by the $\pi/2$ from the AC voltage based on the magnitude detected by the voltage detection unit and capacitance of the capacitor;

calculating a target value for a phase delay of the pulsating current with respect to the pulsating voltage based on the magnitude calculated by the first calculation unit and the magnitude detected by the detection unit;

calculating an operation amount for delaying a phase of the switching based on the target value calculated by the second calculation unit; and regarding a second operation amount as the calculated operation amount in a case where the magnitude detected by the detection unit is smaller than a predetermined threshold.

* * * * *